(12) United States Patent
Persiantsev

(10) Patent No.: US 11,470,355 B1
(45) Date of Patent: Oct. 11, 2022

(54) QUALITY CONTROL ENGINE FOR VIDEO COMPRESSION

(71) Applicant: Vulcan Inc., Seattle, WA (US)

(72) Inventor: Michael Persiantsev, Shrewsbury, MA (US)

(73) Assignee: Vulcan Inc., Seattle, WA (US)

( * ) Notice: Subject to any disclaimer, the term of this patent is extended or adjusted under 35 U.S.C. 154(b) by 103 days.

(21) Appl. No.: 16/262,688

(22) Filed: Jan. 30, 2019

(51) Int. Cl.
*H04N 19/64* (2014.01)
*H04N 19/91* (2014.01)
*H04N 19/105* (2014.01)
*H04N 19/154* (2014.01)
*H04N 19/186* (2014.01)
*H04N 19/137* (2014.01)

(52) U.S. Cl.
CPC ........... *H04N 19/64* (2014.11); *H04N 19/105* (2014.11); *H04N 19/137* (2014.11); *H04N 19/154* (2014.11); *H04N 19/186* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 6,307,971 B1 | 10/2001 | Persiantsev et al. | |
| 6,310,973 B1 | 10/2001 | Persiantsev et al. | |
| 6,310,974 B1 | 10/2001 | Persiantsev et al. | |
| 6,310,975 B1 | 10/2001 | Persiantsev et al. | |
| 6,310,976 B1 | 10/2001 | Persiantsev | |
| 6,310,977 B1 | 10/2001 | Persiantsev | |
| 6,310,978 B1 | 10/2001 | Persiantsev | |
| 6,310,979 B1 | 10/2001 | Persiantsev et al. | |
| 6,314,207 B1 | 11/2001 | Persiantsev et al. | |
| 6,347,155 B1 | 2/2002 | Persiantsev et al. | |
| 6,549,652 B1 | 4/2003 | Persiantsev et al. | |
| 6,825,876 B1 | 11/2004 | Easwar et al. | |
| 7,158,681 B2 | 1/2007 | Persiantsev | |
| 10,032,252 B2 | 7/2018 | Azuma | |
| 10,163,192 B2 | 12/2018 | Suzuki | |
| 2002/0172429 A1 | 11/2002 | Boliek et al. | |
| 2004/0005005 A1* | 1/2004 | McIntyre | H04N 19/63 375/240.19 |
| 2004/0156549 A1 | 8/2004 | Persiantsev | |

(Continued)

OTHER PUBLICATIONS

U.S. Appl. No. 16/262,680, filed Jan. 30, 2019.

(Continued)

*Primary Examiner* — On S Mung
(74) *Attorney, Agent, or Firm* — Davis Wright Tremaine LLP

(57) ABSTRACT

A portion of a first wavelet transform associated with a first frame in a sequence is compressed to produce a first compressed or modified portion of the first wavelet transform. The first modified portion is stored in the memory. A portion of a second wavelet transform associated with a second frame in the sequence is obtained. A set of differences between the portion of the second wavelet transform and the first compressed portion of the first wavelet transform is determined. A second compressed portion is generated based at least in part on the set of differences. A subset of a set of image data is provided to be displayed on a display device based at least in part on the second compressed portion.

20 Claims, 11 Drawing Sheets

(56) References Cited

U.S. PATENT DOCUMENTS

| | | |
|---|---|---|
| 2006/0239570 A1 | 10/2006 | Chi et al. |
| 2008/0140428 A1 | 6/2008 | Choo et al. |
| 2012/0082219 A1* | 4/2012 | Sun .................. H04N 19/14 |
| | | 375/240.12 |
| 2017/0118491 A1 | 4/2017 | Togita |
| 2019/0182483 A1 | 6/2019 | Oishi |
| 2019/0371348 A1* | 12/2019 | Shahbazi Mirzahasanloo ............ |
| | | H04W 84/12 |

OTHER PUBLICATIONS

U.S. Appl. No. 16/262,703, filed Jan. 30, 2019.
U.S. Appl. No. 16/262,709, filed Jan. 30, 2019.
Chai et al., "A Bayesian Approach to Color Classification in YCbCr Color Space," Intelligent Systems and Technologies for the New Millennium (Cat. No. 00CH37119) 2:421-424, Sep. 24, 2000.
Chung et al., "Color Demosaicing Using Variance of Color Differences," IEEE Transactions on Image Processing 15(10):2944-55, Sep. 18, 2006.
Kerofsky et al., "Color gamut scalable video coding," Data Compression Conference, Mar. 20, 2013, 17 pages.

* cited by examiner

QUALITY CONTROL ENGINE FOR VIDEO COMPRESSION

CROSS-REFERENCE TO RELATED APPLICATIONS

This application incorporates by reference for all purposes the full disclosure of co-pending U.S. patent application Ser. No. 16/262,680, filed concurrently herewith, entitled "KEY AND DIFFERENCE BLOCK VIDEO COMPRESSION," U.S. patent application Ser. No. 16/262,703, filed concurrently herewith, entitled "QUALITY CONTROL ENGINE FOR VIDEO DECOMPRESSION," and U.S. patent application Ser. No. 16/262,709, filed concurrently herewith, entitled "KEY AND DIFFERENCE BLOCK VIDEO DECOMPRESSION."

BACKGROUND

Data obtained from a digital video camera or other image capture device may contain minimally processed data from the image sensor. However, as digital video cameras have become more advanced, the number of pixels per image frame have increased, thereby placing additional demand on bandwidth and storage resources for transmitting and storing large amounts of image data prior to the image data being converted to a particular image format. Consequently there is a need for efficient and increased compression and decompression of raw image data with minimal loss to image quality for transmission, storage, and display.

BRIEF DESCRIPTION OF THE DRAWINGS

Various techniques will be described with reference to the drawings, in which.

DETAILED DESCRIPTION

Figure 1:
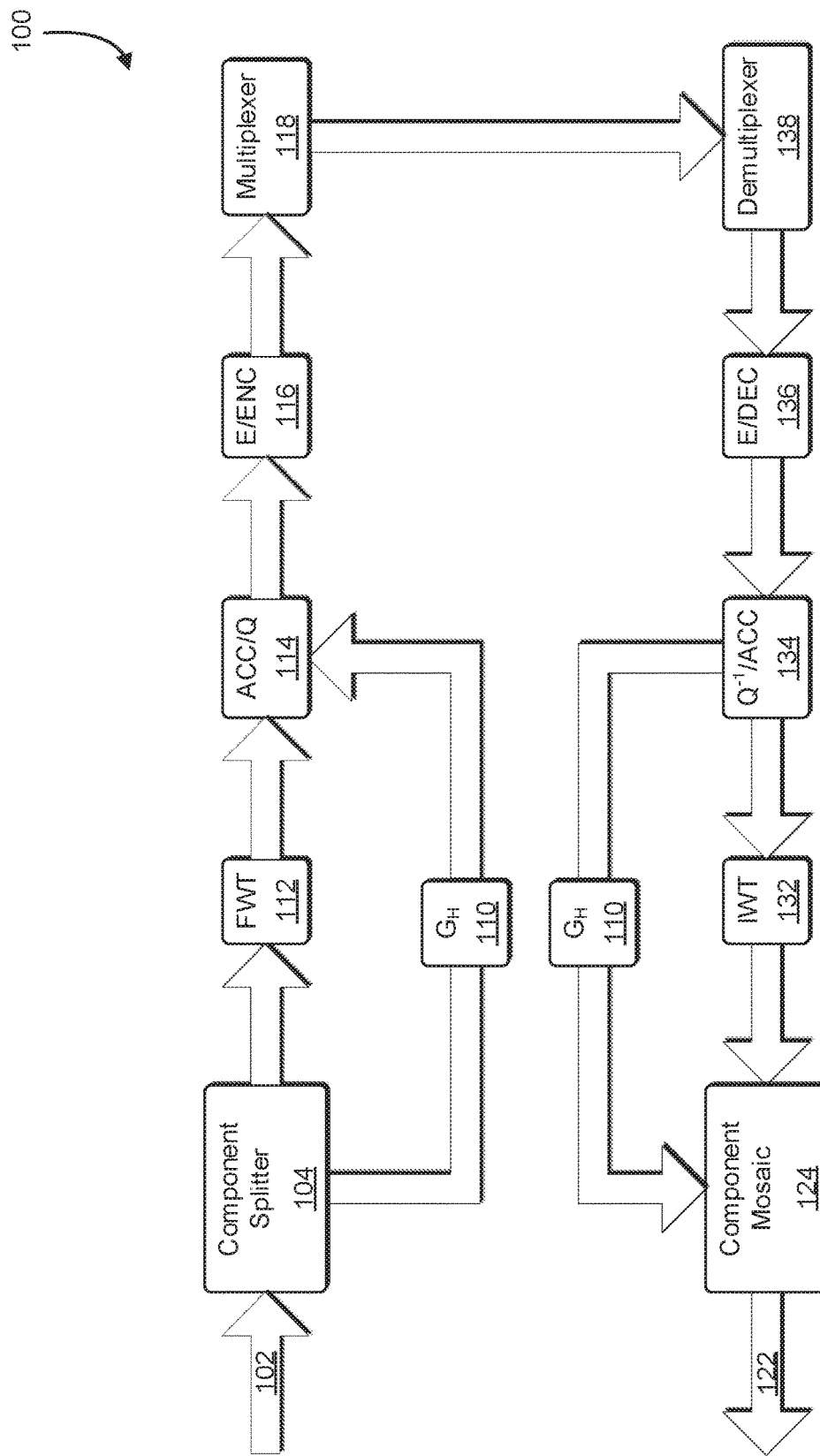
FIG. 1 illustrates an example of compression and decompression of image data in accordance with an embodiment.

Techniques and systems described below relate to video compression and decompression and quality control for video compression and decompression. In one example, image data of a sequence of raw image data produced by a color filter array is obtained, with the image data comprising a mosaic of quad matrices of color data. In the example, the quad matrices are split into a set of red component values, a first set of green component values, a second set of green component values, and a set of blue component values. Further, in the example, a set of low frequency green component values and a set of high frequency green component values is generated based at least in part on the first set of green component values and the second set of green component values. Still in this example, a forward wavelet transform is performed to the set of low frequency green component values to produce a set of wavelet blocks.

In the example, a set of output blocks is produced. For example, for each wavelet block of the set of wavelet blocks, the wavelet block is quantized to produce a quantized block and a difference amount between the quantized block and a corresponding output block of previous image data of the sequence is determined. Still further, for each wavelet block, an output block is determined based at least in part on the difference amount and the output block is entropy encoded to produce an encoded block. Then, in the example, the set of encoded blocks is multiplexed with sets of blocks derived from the set of red component values, the set of blue component values, and the set of high frequency green component values to produce a multiplexed stream of encoded image data. Finally, in the example, the multiplexed stream is provided to a device for display.

In another example, a compressed block of a previous wavelet transform that corresponds to the wavelet block is obtained. In the example, a set of differences between the wavelet block and the compressed block is determined. Also in the example, either the set of differences or the wavelet block is quantized to a first amount of precision to produce a first processed wavelet block, dependent at least on a determination of whether to output a key block or a difference block.

In the example, a first relative error associated with the first processed wavelet block is determined to reach a value relative to (e.g., exceed, meet or exceed, etc.) a quality threshold. In the example, dependent at least on the determination, either the set of differences or the wavelet block is re-quantized to a second amount of precision to produce a second processed wavelet block. Further in the example, a second relative error between the wavelet block and the second processed wavelet block is determined to be at or below the quality threshold. Finally, in the example, a portion of image data as either the key block or the difference block to be displayed as an image on a display device is output based at least in part on the second processed wavelet block.

In yet another example, a quantized portion of first image data is obtained. In the example, the quantized portion of a first image data is de-quantized according to a first amount of precision to produce a first de-quantized image block. In this example, a first relative error between the first de-quantized image block and the quantized portion is determined to reach a value relative to (e.g., exceed, meet or exceed, etc.) a quality threshold. Also in the example, the quantized portion is de-quantized according to a second amount of precision to produce a second de-quantized image block.

Still in the example, a second relative error between the second de-quantized image block and the quantized portion is determined to be at or below the quality threshold. Further in the example, an image block from the portion of first image data is derived based at least in part on a determination which of either a key block or difference block the quantized portion is. Still further in the example, an accumulator is updated, based at least in part on a determination of which of either a key block or a difference block the second de-quantized image block is, using the image block. Finally in the example, contents of the accumulator are output as second image data to be displayed on a display device.

In still another example, a multiplexed stream of encoded image data is obtained. In this example, the multiplexed stream is demultiplexed to produce a set of encoded blocks and sets of blocks, where the sets of blocks are derived from a set of red component values, a set of blue component values, and a set of high frequency green component values. Further in this example, a set of wavelet blocks is produced by, for example, for each encoded block of the set of encoded blocks the encoded block is entropy decoded to produce an input block and the input block is inverse quantized to produce a wavelet block.

Also in this example, an inverse wavelet transform is performed to the set of wavelet blocks to produce a set of low frequency green component values. Still in this example, a first set of green component values and a second set of green component values are generated based at least in part on the set of low frequency green component values and the set of high frequency green component values. Additionally, in this example, the set of red component values, the first set of green component values, the second set of green component values, and the set of blue component values are combined into a mosaic of quad matrices of color data. Finally, in this example, the mosaic is converted to an image file format to be displayed on a display device.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of image processing, by providing a system that highly compresses image data in an efficient manner. Additionally, techniques described and suggested in the present disclosure improve the efficiency of image processing systems by efficiently compressing and decompressing individual wavelet blocks of a wavelet transform of the image data. Moreover, techniques described and suggested in the present disclosure are necessarily rooted in computer technology in order to overcome problems specifically arising with transmitting large amounts of raw image data produced by high resolution video cameras by implementing a fast and efficient scheme for highly compressing and decompressing the raw image data.

FIG. 1 illustrates an example 100 of compression and decompression of an embodiment of the present disclosure. Specifically, FIG. 1 depicts the compression of an initial raw Bayer frame image 102, beginning with a component splitter 104, which may separate the high frequency sub band of the green component 110 from the other components. The other components may undergo a forward wavelet transform 112, and may be joined and processed with the high frequency sub band of the green component 110 utilizing an accumulator/quantizer (ACC/Q) 114. The result may then be encoded with an entropy encoder (E/ENC) 116. The result may then be reconstructed using a multiplexer 118. For decompression, the compressed image is separated into its respective components using a demultiplexer 138. The components may then be decoded utilizing the entropy decoder (E/DEC) 136; the decoded components may be processed by the de quantizer/accumulator ($Q^{-1}$/ACC) 134. The processed components, with the exception of the high frequency sub band of the green component 110, then undergo an inverse wavelet transform (IWT) 132, and may then be rejoined with the high frequency sub band of the green component 110 via a component mosaic 124 to reconstruct the original raw Bayer frame sequence 122.

In an embodiment, raw Bayer frame image 102 is a raw image format created utilizing a color filter array (CFA) or a color filter mosaic (CFM) overlaid onto an image capturing device's sensor. In some embodiments, the image capture device includes an image sensor (e.g., charge-coupled device (CCD) or complementary metal-oxide-semiconductor (CMOS)), memory, image processing capability, and/or a microphone. Examples of such image capture devices include a digital video camera, a web camera, a mobile telephone, and so on. Although the present disclosure refers to Bayer image data in various portions of the present disclosure, it is contemplated that the techniques described in the present disclosure may be applied to other processed (e.g., Tagged Image File Format (TIFF), Joint Photographic Experts Group (JPEG), etc.) and unprocessed (raw) image formats. In some examples, "raw" image data may refer to minimally processed image data as received from an image capture device.

In some examples, the raw Bayer frame image 102 produced from a mosaic of grids by an image sensor, such as a charge-coupled device CCD sensor, or other device having cells that react to light. In some embodiments, each grid includes a two-by-two submosaic (also referred to as a "quad matrix"), containing 2 green filters, 1 blue filter, and 1 red filter; each filter corresponding to one pixel sensor. The raw Bayer frame image 102 produced by the mosaic of grids outputs a mosaic of image data that may be formatted according to a specific raw image format, such as Tag Image File Format/Electronic Photography (TIFF/EP), raw image format (RAW), or Digital Negative (DNG). The raw Bayer frame image 102 may also be one of a sequence of frames captured during a video capture event of a scene. Further details regarding the raw Bayer frame image 102 can be found in the descriptions of FIG. 2.

In an embodiment, component splitter 104 comprises hardware and/or software executed by a computing device, such as the computing device 1100 of FIG. 11, by multiples of such computing devices in a distributed system of a computing resource service provider, or by any virtual instantiation of such a computing device, to perform the process described below. The computing device performing the component splitting may receive the raw Bayer frame image 102 as input, and separate the raw Bayer frame image 102 into four color components: red, blue, and two green components.

In some examples, the components correspond to the grid format of the raw Bayer frame image 102. The green components may be filtered, utilizing another filter contained within the component splitter, which may include a quadrature mirror filter, various average and difference filters, or any combination thereof, into two components, a green high frequency sub-band ($G_H$ 110) and a green low frequency sub-band ($G_L$). In various examples, the green high frequency sub-band ($G_H$ 110) represents the difference between the two green components, whilst the green low frequency sub-band ($G_L$) represents the average between the two green components. The remaining three components, red, blue and green low frequency sub-band ($G_L$) may be input to the forward wavelet transform (FWT) 112.

In an embodiment, the forward wavelet transform (FWT) 112 comprises hardware and/or software executed by the same or a different computing device as performed in the component splitter 104. The computing device performing the forward wavelet transform (FWT) 112 receives as an input values of a component of color, which may include red, blue, and green low frequency sub-band ($G_L$) output by the component splitter 104. The forward wavelet transform (FWT) 112 (which may include sequences of functions such as the Haar wavelet transform, biorthogonal CDF 5/3 wavelet (also called the LeGall 5/3 wavelet) transform or Cohen-Daubechies-Feauveau 9/7 wavelet transform) may separate each component into a high sub-band and low sub-band. The high sub-band may contain the most substantial parts of the component values, whereas the low sub-band may contain only small differential corrections of the component values.

The forward wavelet transform (FWT) 112 then utilizes the sub-bands to separate and regroup the component values. In some examples, the separation and regrouping may regroup the component values in various permutations of the high sub-band and low sub-band, or wavelet blocks. The output of the forward wavelet transform may be received as input to the accumulator/quantizer (ACC/Q) 114. Further details regarding the forward wavelet transform (FWT) 112 can be found in the description of FIG. 4.

In an embodiment, the accumulator/quantizer (ACC/Q) 114 comprises hardware and/or software executed by the same or a different computing device as performed in the component splitter 104. The computing device performing the accumulator/quantizer (ACC/Q) 114 process receives as input frames consisting of wavelet blocks, which may originate from the output of the forward wavelet transform (FWT) 112 or some other source, including the high frequency sub-band of green ($G_H$) 110. For example, the wavelet blocks may correspond to the forward wavelet transforms of each of the color components output from the component splitter, namely red, blue, and low frequency sub-band of green, as well as the high frequency sub-band of the green component alone. In an embodiment, the accumulator/quantizer (ACC/Q) 114 processes each frame by storing copies of each frame, and comparing them to previous frames. Based on the comparison, certain features of each frame may be stored and/or transmitted.

In some examples, the input may be two similar frames, input one after the other. The accumulator/quantizer (ACC/Q) 114 may retain and process the first frame, and process only the different features of the second frame. The quantizer, based on a user input parameter, may quantize the final frame to a desired level of quality. The function of the accumulator may be utilized for sequences of frames which, in some examples, are a sequence of frames captured by a video capture event of a scene. For example, for a single frame, which produces a single set of wavelet blocks, the accumulator may store the blocks without comparing it to other frames and transmit it to the quantizer for its quantization. Further details regarding the accumulator/quantizer (ACC/Q) 114 and its function with regard to a sequence of frames and multiple wavelet blocks can be found in the descriptions of FIG. 7.

In an embodiment, the entropy encoder (E/ENC) 116 comprises hardware and/or software executed by the same or a different computing device as performed in the component splitter 104. The computing device performing the entropy encoder (E/ENC) 116 process may receive as an input a discrete digital signal, in which it may losslessly encode the bit planes of the discrete digital signal. In some examples, the input may be the quantized signal output from the accumulator/quantizer (ACC/Q) 114; a quantized signal may be formed for each of the color components from the raw Bayer frame image 102: red, blue, low frequency sub-band of green, and high frequency sub-band of green. The entropy encoder (E/ENC) 116 may include encodings, or data compression methods such as arithmetic coding (a form of entropy encoding that differs from other forms of entropy encoding, such as Huffman coding, in that rather than separating the input into component symbols and replacing each with a code, arithmetic coding encodes the entire message into a single number (e.g., an arbitrary-precision fraction q where $0.0 \leq q < 1.0$) that represents the current information as a range, defined by two numbers), exponential-Golomb coding, RLE encoding, Huffman coding, or any combination thereof to achieve its encoding. The compressed data for each component of color may then be received as inputs to the multiplexer 118.

In an embodiment, the multiplexer 118 comprises hardware and/or software executed by the same or a different computing device as performed in the component splitter 104. The computing device performing the multiplexer 118 process may receive, as inputs, the compressed data for each component of color, which may originate from the raw Bayer frame image 102. The multiplexer may stream each of its inputs to a demultiplexer 138 for the decompression of the stream. For example, the multiplexer 118 may receive as inputs the compressed data for the red, blue, low frequency and high frequency sub-bands of the green components, which may be output from the entropy encoder (E/ENC) 116. The multiplexer may multiplex, or join together utilizing the multiplexer, the inputs into a stream comprising of all of the components, which may be input to the demultiplexer in which the compressed data can be begun to be decompressed.

In an embodiment, the demultiplexer 138 comprises hardware and/or software executed by the same or a different computing device as performed in the component splitter 104. The computing device performing the demultiplexer 138 process may receive as an input a stream of compressed data output from the multiplexer 118. The demultiplexer 138 may stream each of the components of the input to the entropy decoder to begin the decompression of the data. For example, the demultiplexer may receive as inputs the compressed data stream for the red, blue, low frequency and high frequency sub-bands of the green components, originating from the raw Bayer frame image 102, which may be output from the multiplexer 118. The demultiplexer may demultiplex, or separate utilizing the demultiplexer, the stream into four separate output streams corresponding to each component, which can be received as inputs to the entropy decoder (E/DEC) 136 to begin the decompression of the data.

In an embodiment, the entropy decoder (E/DEC) 136 comprises hardware and/or software executed by the same or a different computing device as performed in the component splitter 104. The computing device performing the entropy decoder (E/DEC) 136 process may receive as an input an encoded compressed data stream. In some examples, the compressed data stream is the output stream from the demultiplexer 138, which can include the compressed data for the red, blue, low frequency and high frequency sub-bands of the green components, which can originate from the raw Bayer frame image 102. The entropy decoder (E/DEC) 136 may decode the compressed data it receives as input. The entropy decoder (E/DEC) 136 may include decoding methods, or data decompression methods such as arithmetic coding, Golomb coding, RLE decoding or Huffman coding to achieve its decoding. The decoded data for each component of color may be received as inputs to the de-quantizer/accumulator ($Q^{-1}$/ACC) 134.

In an embodiment, the de-quantizer/accumulator ($Q^{-1}$/ACC) 134 comprises hardware and/or software executed by the same or a different computing device as performed in the component splitter 104. The computing device performing the de-quantizer/accumulator ($Q^{-1}$/ACC) 134 process may receive as inputs decoded data streams. The input may be the decoded wavelet blocks originating from the output of the entropy decoder (E/DEC) 136, which may correspond to the wavelet blocks for each component of color originating from the raw Bayer frame image 102, namely red, blue, low frequency and high frequency sub-bands of green.

The de-quantizer/accumulator ($Q^{-1}$/ACC) 134 begins with a de-quantization of the wavelet blocks. This may entail restoring the wavelet blocks to their original form. In some examples, this may look like the component wavelet blocks being restored to their original dynamic range and format. The accumulator may restore the wavelet blocks to their original complete form. In some examples, this may look like the wavelet blocks, based on an identifier, which may include metadata or some other indication, being reconstructed into the original wavelet blocks it comprised of. These wavelet blocks may then be output to be further processed. In some examples, the wavelet blocks for the image components red, blue, and low frequency sub-band of green may be output to the inverse wavelet transform (IWT) 132, while the high frequency sub-band of green ($G_H$ 110) may be output directly to the component mosaic 124. Further details regarding the de-quantizer/accumulator ($Q^{-1}$/ACC) 134 can be found in the descriptions of FIG. 8.

In an embodiment, the inverse wavelet transform (IWT) 132 comprises hardware and/or software executed by the same or a different computing device as performed in the component splitter 104. The computing device performing the inverse wavelet transform (IWT) 132 may receive as an input the de-quantized wavelet blocks as output from the de-quantizer/accumulator ($Q^{-1}$/ACC) 134. These wavelet blocks may correspond to components of color originating from the raw Bayer frame image 102, namely red, blue, and low frequency sub-band green. The inverse wavelet transform, which may include sequences of inverse functions (such as the Haar wavelet transform, or Cohen-Daubechies-Feauveau 9/7 wavelet transform, or LeGall 5/3 wavelet transform), may rejoin the high sub-bands and low sub-bands of the wavelet blocks in various permutations. In some examples, this may look like the wavelet blocks being converted back into the spatial domain. The output of the inverse wavelet transform may then be utilized in the component mosaic 124.

In an embodiment, the component mosaic 124 comprises hardware and/or software executed by the same or a different computing device as performed in the component splitter 104. The computing device performing the component mosaic 124 process may receive as an input image data, which may correspond to components of color originating from the raw Bayer frame image 102, namely red, blue, low frequency sub-band of green, and high frequency sub-band of green ($G_H$ 110). The green components may be joined utilizing a filter, which may include an inverse quadrature mirror filter, to form a singular green image component data. The component mosaic 124 may join the image data for red, blue, and the newly formed green to form a raw Bayer frame image 122. In some examples, the raw Bayer frame image 122 may be an exact copy or representation of the input raw Bayer frame image 102.

Figure 2:
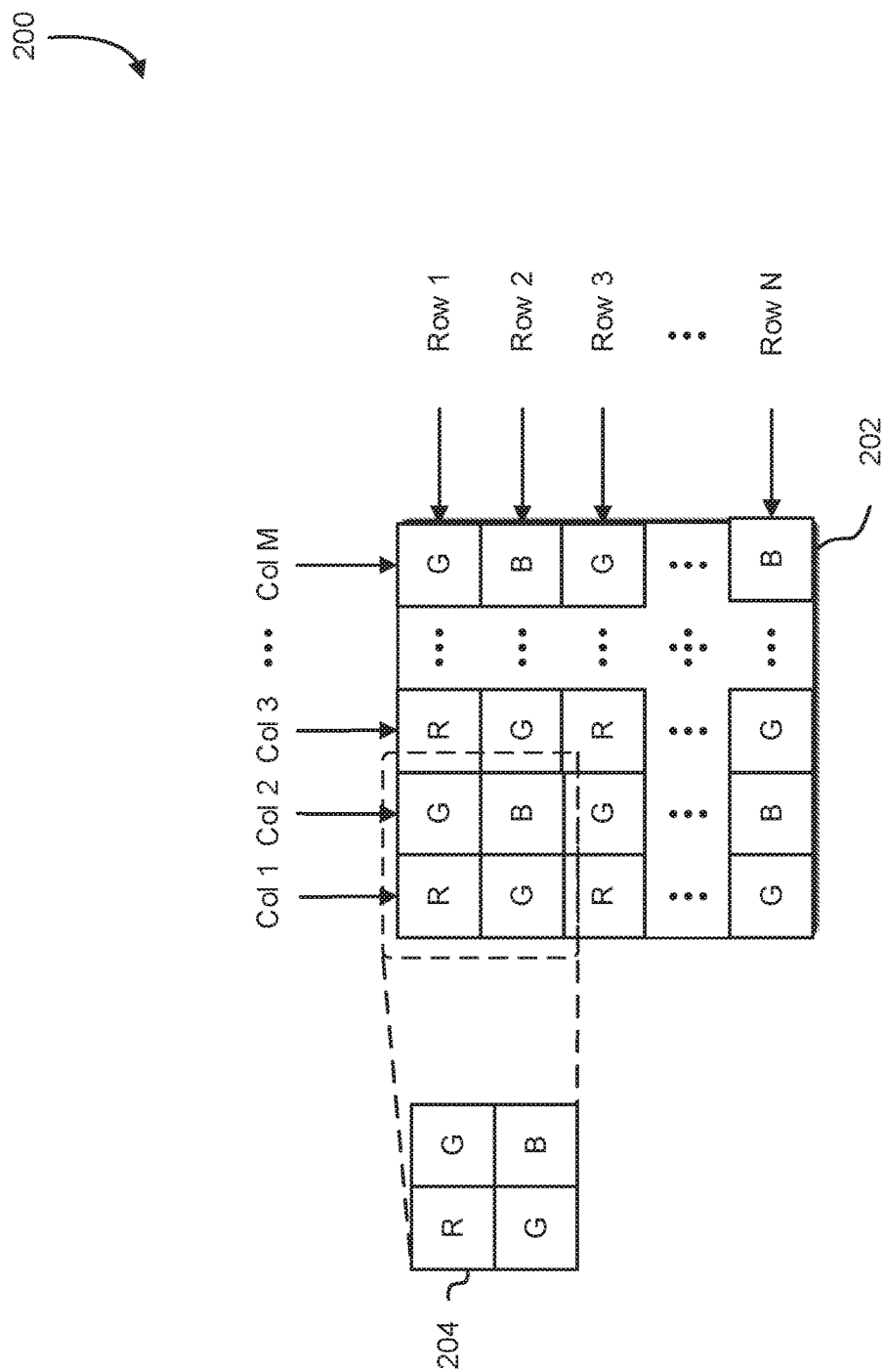
FIG. 2 illustrates an example of a sequence of quad matrices in accordance with an embodiment.

FIG. 2 illustrates an example 200 of a sequence of quad matrices of an embodiment of the present disclosure. Specifically, FIG. 2 depicts image data comprising of a mosaic of quad matrices of color data, such as quad matrix 204. For example, the image data may be raw image data such as the raw Bayer frame image 102 of FIG. 1.

In an embodiment, the image data 202 is a mosaic of quad matrices of color data. The image data 202 may be arranged according to row/column or according to some other arrangement. The image data may be produced by an image capture device utilizing a filter, such as a Bayer filter. The image data may be created utilizing a color filter array (CFA) or a color filter mosaic (CFM) overlaid onto an image capturing device's sensor. In embodiments, the image capture device includes an image sensor (e.g., charge-coupled device CCD or complementary metal-oxide-semiconductor (CMOS)), memory, image processing capability, and/or a microphone. Examples of such image capture devices include a digital video camera, a web camera, a mobile telephone, and so on.

In some examples, the image data 202 may be a raw Bayer frame image that comprises a mosaic of grids with cells that react to light. Each grid includes a two-by-two submosaic (e.g., the quad matrix 204), containing 2 green filters, 1 blue filter, and 1 red filter; each filter corresponding to one pixel sensor (as denoted by R (red), B (blue), and G (green)). The raw Bayer frame image may be formatted according to a specific raw image format, such as Tag Image File Format/Electronic Photography (TIFF/EP), raw image format (RAW), or Digital Negative (DNG). The raw Bayer frame image may also be one of a sequence of frames captured during a video capture event of a scene.

The quad matrix 204 may be a 2×2 matrix comprising four component values that correspond to the color values of a pixel of image data. In embodiments, the quad matrix may include at least one primary color of a color model/space. In the example 200 depicted, the quad matrix comprises two green component values and at least one non-green component value (e.g., red and blue). It is contemplated, however, that techniques of the present disclosure may be applied to other color models/spaces. For example, instead of component values for primary colors of red, green, and blue, the quad matrix may be component values for primary colors of cyan, magenta, yellow, and black. As depicted in the example 200, in some embodiment the color filter yields more than one component value dedicated to a particular primary color (e.g., green) in the quad matrix 204. Because the more than one component values may be produced from a different physical cell of an image sensor, they may have different values; however, it is contemplated that because the more than one component values within the quad matrix 204 are in close proximity to each other (e.g., horizontally, vertically, or diagonally adjacent), the difference between their values will be small for a majority of the image data. Thus, rather sending or storing the two different values for the more than one component values, it may be more efficient to send the average of the more than one component values and the difference between the more than one component values, the latter of which is likely to be a small value most of the time. In this manner, each of the more than one component values may be reconstructed using this average and difference (e.g., adding/subtracting the difference to/from the average).

Figure 3:
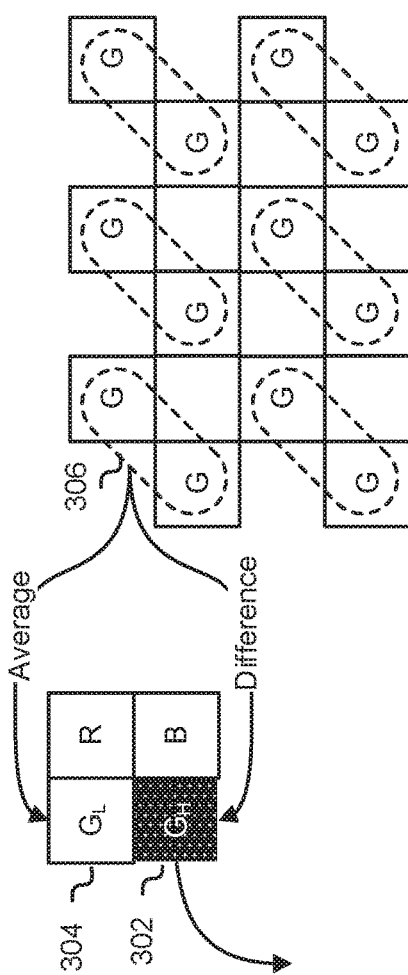
FIG. 3 illustrates an example of determining average and difference green component values in accordance with an embodiment.

FIG. 3 illustrates an example 300 of determining average and difference green component values of an embodiment of the present disclosure. Specifically, FIG. 3 depicts how the high frequency sub-band of green 302 ($G_H$) and the low frequency sub-band of green 304 ($G_L$) components may be formed from the green components of each quad mosaic of the image data; the image data referring to the image data discussed in the description of FIG. 2. In an embodiment, high frequency sub-band of green 302 ($G_H$) and low frequency sub-band of green 304 ($G_L$) components are formed by filtering two green components of the image data, such as the two green components 306. In some embodiments, the two green components are adjacent to each other within the quad matrix. In some embodiments, "adjacent" includes diagonally adjacent as well as horizontally or vertically adjacent. High frequency sub-band of green 302 ($G_H$) may represent the difference between the two green components, whilst low frequency sub-band of green 304 ($G_L$) may represent an average of the two green components. In this manner, by combining (e.g., adding and subtracting) the high frequency sub-band of green 302 ($G_H$) and the low frequency sub-band of green 304 ($G_L$), the original two green component values can be reconstructed. The filter may include various average and difference filters, a quadrature mirror filter, or any combination thereof to produce the two aforementioned components.

Figure 4:
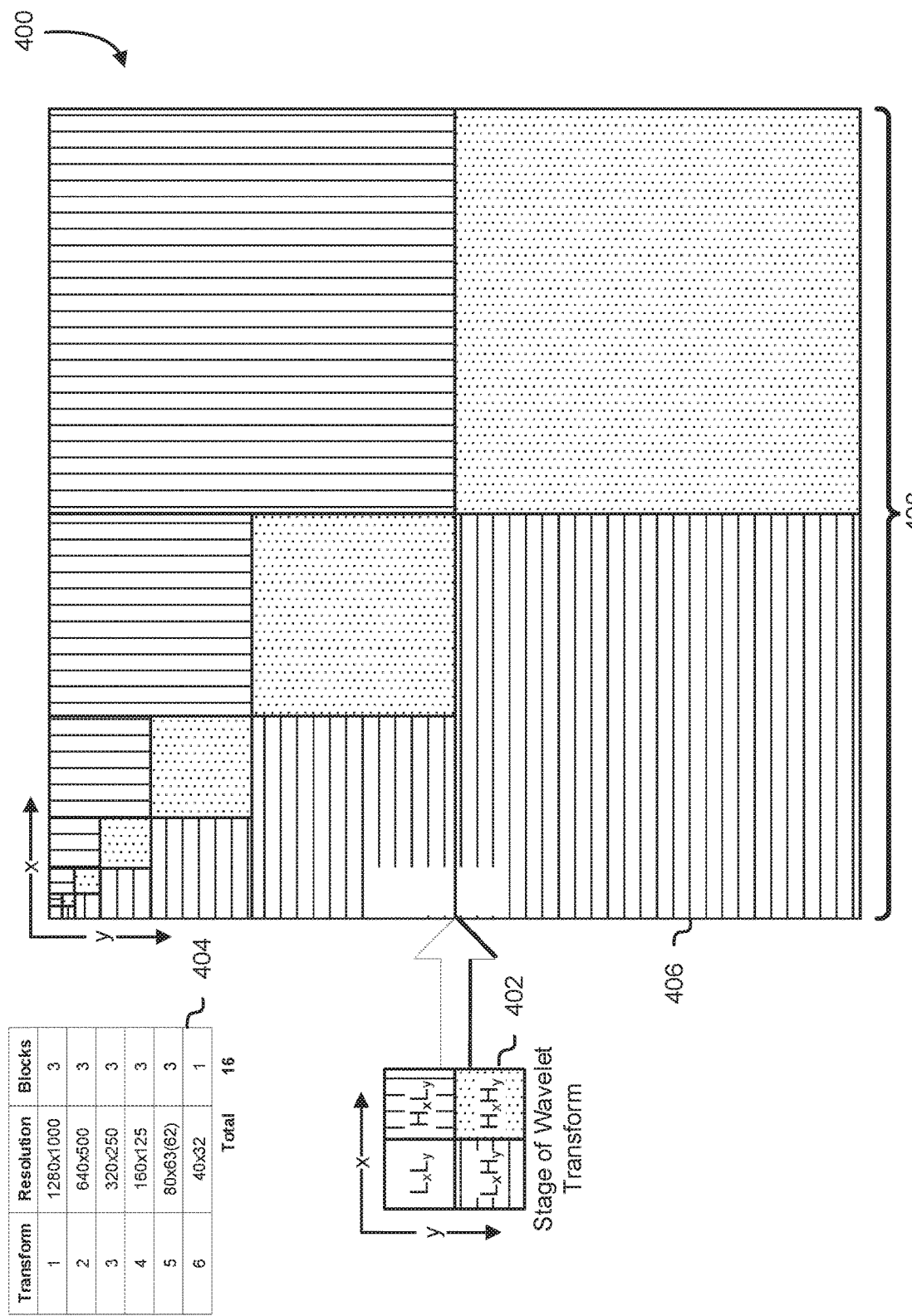
FIG. 4 illustrates an example of a forward wavelet transform in accordance with an embodiment.

FIG. 4 illustrates an example 400 of a forward wavelet transform 406 of an embodiment of the present disclosure. Specifically, FIG. 4 depicts five stages of a wavelet transform, resulting in 16 wavelet blocks 408 in 6 resolutions. In an embodiment, the example 400 is the result of five successive stages of the wavelet transform; each stage of the wavelet transform being denoted by 402.

In an embodiment, 402, depicted as a stage of the wavelet transform, is a transform process that is applied to a set of color values from image data. For example, 402 may be applied to a set of red, blue, or low frequency sub-band of green component values, which origins are discussed in the descriptions of FIG. 2 and FIG. 3. The wavelet transform, which may include sequences of functions such as functions (such as the Haar wavelet transform, or Cohen-Daubechies-Feauveau 9/7 wavelet transform, or LeGall 5/3 wavelet transform), may separate and recombine the high sub-bands and low sub-bands of the component values. In some examples, the high sub-band represents the details or differences in the image data, whilst the low sub-band represents the averages of the image data. The high sub-band (H) may also be calculated by dividing the difference of two adjacent values by a constant value, while the low sub-band (L) may be calculated by dividing the sum of two adjacent values by a constant value. The sub-bands may also be calculated by various other techniques. The subscript, for example $L_x$, denotes the axis of which the data originates from; $L_x$ denotes the low sub-band of the x axis.

In an embodiment, 402, which depicts a stage of the wavelet transform, is divided into four quadrants, each quadrant comprising of a wavelet block containing a permutation of the high sub-bands (H) and low sub-bands (L). The top left quadrant may include the x and y axis data for the low sub-band (L), which may result in the quadrant containing average values of the overall data. The top right quadrant may include the x axis data for the high sub-band (H) and the y axis data for the low sub-band (L), which may result in a quadrant containing vertical lines to represent the differences of the data in the horizontal direction. The bottom left quadrant may include the x axis data for the low sub-band (L) and y axis data for the high sub-band (H), which may result in a quadrant containing horizontal lines to represent the differences of the data in the vertical direction. The bottom right quadrant may include x and y axis data for the high sub-band (H), which may result in the quadrant containing information representing the differences of the data in both the horizontal and vertical directions.

Successive stages of the wavelet transform occur on the top left quadrant. For example, 402 depicts a single stage of the wavelet transform. The same process of the wavelet transform may be applied to the top left quadrant, which may include the x and y axis data for the low sub-band (L), which can correspond to an average of the image data. The result of the wavelet transform then takes the place of the top left quadrant wavelet block. The process may be repeated a number of times. For example, 400 depicts a five stage transform, yielding 16 wavelet blocks 408 in total.

In an embodiment, the table 404 depicts the resolution of the wavelet blocks 408 for each successive transform, or stage, of the forward wavelet transform. The resolutions correspond to the resolution of the wavelet blocks 408 in each stage of the forward wavelet transform. For example, 400 depicts a five stage wavelet transform. The first stage of the transform may contain three wavelet blocks, each with a resolution of 1280×1000. The example 400 depicts these blocks as the largest block in the top right, bottom right, and bottom left quadrants. The second stage of the transform is depicted as the three largest blocks in the top left quadrant of the whole depiction, as the successive transforms occur on the top left quadrant. The resolution of these blocks may be 640×500. This process may be followed similarly for all five stages, with the sixth transform referring to the final size of the wavelet blocks (also referred to as the lowest resolution wavelet block) following the fifth transform. The lowest resolution wavelet block is depicted as the wavelet block in the top left-hand corner of the forward wavelet transform 406.

Figure 5:
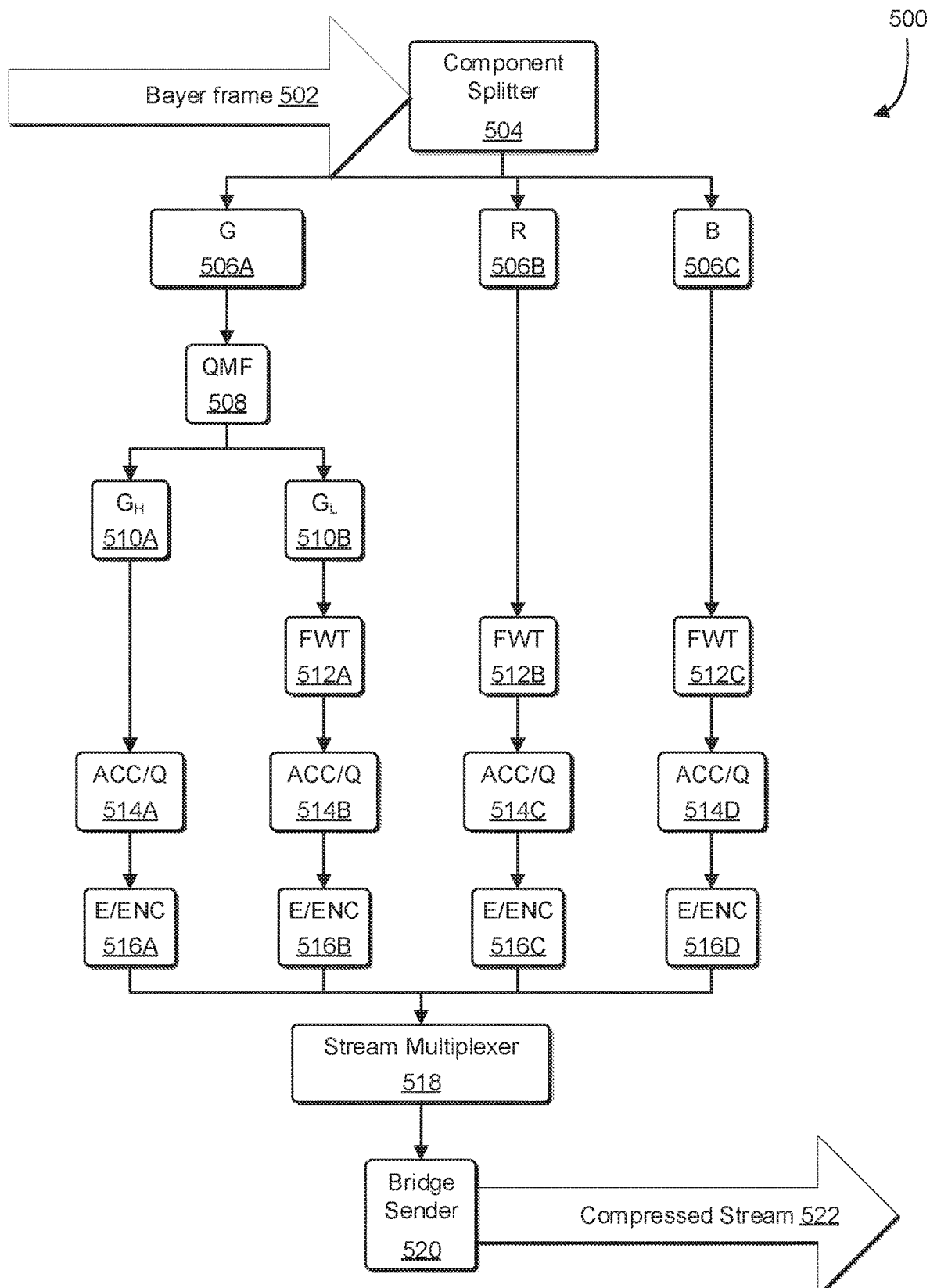
FIG. 5 illustrates an example of compression blocks of an image frame in accordance with an embodiment.

FIG. 5 illustrates an example 500 of compression of an image frame of an embodiment of the present disclosure. Specifically, FIG. 5 depicts a Bayer frame 502 and the series of functions that produce a compressed stream 522 from the Bayer frame 502.

In an embodiment, Bayer frame 502 is an image such as the raw Bayer frame image 102 of FIG. 1. The Bayer frame 502 may be split via the component splitter 504 into three color components 506A-06C, corresponding to green (G), red (R), and blue (B). The G component 506A may be further split using a quadrature mirror filter (QMF) 508 into a high sub-band $G_H$ 510A and a low sub-band $G_L$ 510B. The remaining R component 506B, B component B 506C, and low sub-band $G_L$ 510B may then be received as inputs by the forward wavelet transforms (FWT) 512A-12C. The wavelet blocks output of the forward wavelet transforms (FWT) 512A-12C may then be received as inputs, as well as the high sub-band $G_H$ 510A, by the accumulator/quantizers (ACC/Q) 514A-14D, which process and quantize the wavelet blocks; the output of which may then be received as inputs to the entropy encoders E/ENC 516A-16D. The entropy encoders (E/ENC) 516A-16D encode the wavelet blocks, which may then be received as inputs to the stream multiplexer 512, which then outputs the stream to a bridge sender 520, which then outputs the compressed stream 522. Note that one or more of the operations performed in 504-22 may be performed in various orders and combinations, including in parallel.

In some examples, the Bayer frame 502 is a mosaic of grids with cells that react to light. Each grid includes a two-by-two submosaic, containing 2 green filters, 1 blue filter, and 1 red filter; each filter corresponding to one pixel sensor. The Bayer frame 502 may be formatted according to a specific raw image format, such as Tag Image File Format/Electronic Photography (TIFF/EP), raw image format (RAW), or Digital Negative (DNG). The Bayer frame 502 may also be one of a sequence of frames captured during a video capture event of a scene. Further information regarding the Bayer frame 502 can be found in the description of FIG. 2.

In an embodiment, the component splitter 504 comprises hardware and/or software executed by a computing device, such as the computing device 1100 of FIG. 11, by multiples of such computing devices in a distributed system of a computing resource service provider, or by any virtual instantiation of such a computing device, to perform the process described below. The computing device performing the component splitter 504 process may receive as an input the Bayer frame 502. The component splitter 504 may split the Bayer frame 502 into its main color components 506A-06C, namely green (G), red (R), and blue (B). In some examples, the amount of green 506A components is twice the amount of the red component 506B or blue component 506C components. This may be the result of the mosaic grid format of the Bayer frame 502, in which each grid includes a two-by-two submosaic, containing 2 green filters, 1 blue filter, and 1 red filter.

In an embodiment, the components green (G), red (R), and blue (B) 506A-06C are the color components of a Bayer frame 502 image. The components may be generated from the output of the component splitter 504. For example, the component splitter 504 may receive as an input the Bayer frame 502 image. The component splitter 504 may split the Bayer frame 502 image into its three color components, green (G), red (R), and blue (B) 506A-06C. Thus, the green (G) color component 506A may contain the green component values from the Bayer frame 502 and exclude the other primary colors (red and blue). Likewise, the red (R) color component 506B may contain the red component values from the Bayer frame 502 and exclude the other primary colors (green and blue). Similarly, the blue (B) color component 506C may contain the blue component values from the Bayer frame 502 and exclude the other primary colors (red and green).

In an embodiment, the quadrature mirror filter (QMF) 508 is a filtering performed by the same or a different computing device as performed in the component splitter 504. The computing device performing the quadrature mirror filtering may split the G component 506A vertically into a high sub-band 510A and a low sub-band 510B. In some examples, the quadrature mirror filter (QMF) 508 may split the G component 506A by creating an average and a difference between values of the G component 506A. The high sub-band 510A may correspond to the difference and the low sub-band 510B may correspond to the average. The creation of the high sub-band 510A and the low sub-band 510B may entail a quadrature mirror filter (QMF) 508, various average and difference filters, or any combinations thereof.

In an embodiment, the high and low sub-bands 510A-10B are high frequency bands, or intervals, and low frequency bands, or intervals, of the G component 506A. The low sub-band 510B may contain the most substantial part of the G component 506A. The high sub-band 510A may contain only small differential corrections to the G component 506A. Further information regarding the frequency sub-bands of green can be found in the description of FIG. 3.

In an embodiment, the forward wavelet transforms 512A-12C comprise hardware and/or software executed by the same or a different computing device as performed in the component splitter 504. The computing device performing the forward wavelet transforms 512A-12C may receive as inputs values of a component of color, which can include the ($G_L$) green low sub-band 510B, the (R) red component 506B, or the (B) blue component 506C.

In an example, the forward wavelet transforms 512A-12C, which may include sequences of functions (such as the Haar wavelet transform, or Cohen-Daubechies-Feauveau 9/7 wavelet transform, or LeGall 5/3 wavelet transform), separate each input component into high sub-bands and low sub-bands. The high sub-bands may contain the most substantial parts of the component values, whereas the low sub-bands may contain only small differential corrections of the component values. The forward wavelet transforms 512A-12C may utilize the sub-bands to separate and regroup the component values. In some examples, the separation and regrouping may regroup the component values in various permutations of the high sub-band and low sub-band. The outputs of the forward wavelet transforms 512A-12C may then be utilized as inputs to the accumulator/quantizers (ACC/Q) 514B-14D. Further information regarding the forward wavelet transform can be found in the description of FIG. 4.

In an embodiment, the accumulator/quantizers 514A-14D comprise hardware and/or software executed by the same or a different computing device as performed in the component splitter 504. The computing device performing the accumulator/quantizers 514A-14D processes may receive as inputs frames consisting of wavelet blocks, which may originate from the output of the forward wavelet transforms 512A-12C or some other source, including the green component's high sub-band 510A. In some examples, the input wavelet blocks may also correspond to specific Bayer frames, such as a Bayer frame 502, in which each set of input wavelet blocks may correspond to a specific color component of the frame such as green, red, or blue 506A-06C.

The Bayer frames may be one of a sequence of frames, such as from a video capture event of a scene, in which the input wavelet blocks may correspond to frames from the video capture. The accumulator portion may store an exact copy of what has been transmitted after each new frame has been processed. The accumulator may also decide whether to transmit whole frames, or differences between frames. The quantizer portion may select the number of bit planes to be transmitted based on quality requirements, and output the quantized frame. The output of the accumulator/quantizers 514A-14D may be received as inputs to the entropy encoders 516A-16D. Further details regarding the accumulator/quantizers 514A-14D and their functions with regards to a sequence of frames can be found in the description of FIG. 7.

In an embodiment, the entropy encoders 516A-16D comprise hardware and/or software executed by the same or a different computing device as performed in the component splitter 504. The computing device performing the entropy encoders 516A-16D processes may receive as inputs a discrete digital signal, in which it may losslessly encode the bit planes of the discrete digital signal. In some examples, the input is the quantized signal output from the accumulator/quantizers 514A-14D; a quantized signal may be formed for each of the color components from the Bayer frame 502: red, blue, low sub band of green, and high sub band of green. The entropy encoders 516A-16D may losslessly encode each bit plane, utilizing encodings or data compression methods such as arithmetic coding, Golomb coding, RLE encoding, Huffman coding, or any combination thereof to achieve its encoding. The compressed data for each component of color may then be received as inputs to the stream multiplexer 518.

In an embodiment, the stream multiplexer 518 comprises hardware and/or software executed by the same or a different computing device as performed in the component splitter 504 to perform the process described below. The computing device performing the stream multiplexer 518 process may receive as inputs multiple compressed streams, which can be output from the entropy encoders 516A-16D, in which it may multiplex the streams to form a singular output stream consisting of all of the input compressed streams. For example, the inputs received may be compressed streams corresponding to components of the Bayer frame 502, output from the entropy encoders 516A-16D. The stream multiplexer may output the compressed streams as a singular compressed stream comprising of some or all of the inputs received.

In an embodiment, the bridge sender 520 comprises hardware and/or software executed by the same or a different computing device as performed in the component splitter 504 to perform the process described below. The computing device performing the bridge sender 520 process may receive as an input a compressed stream of data, in which it may output the compressed stream of data to be received. The output may be received by a bridge receiver, in which it may be processed to be decompressed, or it may be output to be stored in a file. For example, the bridge sender 520 may receive a compressed stream of image data. The bridge sender 520 may output the compressed stream of image data to a bridge receiver, such as the bridge receiver 620, which may receive the data to be decompressed. The bridge sender 520 may alternatively output the compressed stream of image data to be stored in a file for further use.

In an embodiment, the compressed stream 522 is a stream of compressed data. The compressed stream 522 may comprise of the compressed image data corresponding to components of the Bayer frame 502. For example, the compressed stream 522 may comprise of the multiplexed compressed components of the Bayer frame 502 output by the stream multiplexer 518, and relayed by the bridge sender 520.

Figure 6:
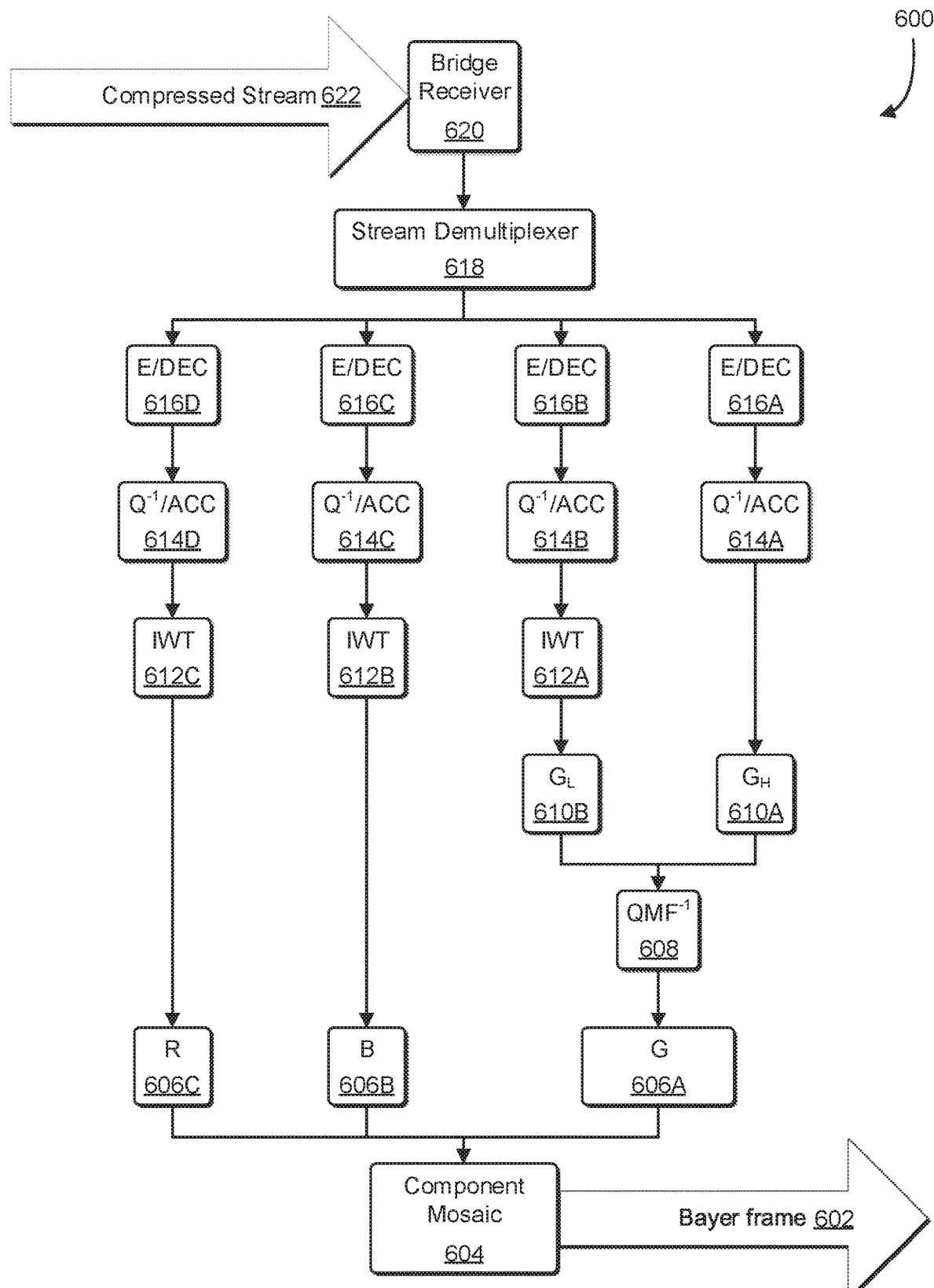
FIG. 6 illustrates an example of decompression of compressed blocks of an image frame in accordance with an embodiment.

FIG. 6 illustrates an example 600 of decompression of a compression image frame of an embodiment of the present disclosure. Specifically, FIG. 6 depicts a compressed stream 622 and the series of functions that produce a Bayer frame 602 from the compressed stream 622.

In an embodiment, compressed stream 622 is a compressed stream containing compressed image data, which may be the compressed stream 522 of FIG. 5. The compressed stream 622 may be received by the bridge receiver 620, and transmitted to the stream demultiplexer 618. The stream demultiplexer 618 demultiplexes the compressed stream into its respective compressed components, which may include image data from components of an image. The compressed components are then received as inputs by the entropy decoders 616A-16D, which decode the components. The decoded components may be received as inputs to the de-quantizer/accumulators 614A-14D. The de-quantizer/accumulators 614A-14D de-quantize the components, restoring them to their original dynamic range and format, and additionally reconstruct any component frames to their original forms. The restored components, with the exception of green's high sub-band 610A, may then be received as inputs to the inverse wavelet transforms 612A-12C, which convert the received components, which may be in the form of wavelet blocks, back into the spatial domain. The inverse quadrature mirror filter 608 may additionally restore the green component from the green high and low sub-bands 610A-10B. The components 606A-06C may then be received as inputs to the component mosaic 604, in which the components 606A-06C may be rejoined into the original image data as the Bayer frame 602. Note that one or more of the operations performed in 604-20 may be performed in various orders and combinations, including in parallel.

In an embodiment, the compressed stream 622 is a stream of compressed data. The compressed stream 522 may comprise of the compressed image data corresponding to components of the Bayer frame 602. For example, the compressed stream 622 may comprise of the multiplexed compressed components of the Bayer frame 602, which may be output by the bridge sender 520 in the form of the compressed stream 522 in FIG. 5.

In an embodiment, the bridge receiver 620 comprises hardware and/or software executed by a computing device, such as the computing device 1100 of FIG. 11, by multiples of such computing devices in a distributed system of a computing resource service provider, or by any virtual instantiation of such a computing device, to perform the process described below. The computing device performing the bridge receiver 620 process may receive as an input a compressed stream of data, in which it may output the compressed stream of data to be further processed. For example, the bridge receiver 620 may receive a compressed stream of image data. The bridge receiver 620 may output the compressed stream of image data to a stream demultiplexer 618 to begin to be decompressed. Alternatively, the bridge receiver 620 may store the compressed stream of image data in a file for further use.

In an embodiment, the stream demultiplexer 618 is hardware that performs and/or software that is performed by the same or a different computing device as performed in the bridge receiver 620. The computing device performing the stream demultiplexer 618 process may receive as an input a singular compressed stream, which can comprise of multiple secondary compressed streams multiplexed together. The singular compressed stream may be the result of a stream multiplexer 518 in FIG. 5 multiplexing multiple secondary streams into a singular stream. The stream demultiplexer 618 may demultiplex the singular compressed stream into its respective secondary streams, and output the secondary streams to be processed. For example, the stream multiplexer 518 in FIG. 5 may multiplex multiple image component data streams into a singular stream, in which the singular stream would be separated into its individual image component data streams by the stream demultiplexer 618.

In an embodiment, the entropy decoders 616A-16D comprise hardware and/or software executed by the same or a different computing device as performed in the bridge receiver 620. The computing device performing the entropy decoders 616A-16D processes may receive as inputs an encoded digital signal. In some examples, the input may be an encoded digital signal corresponding to a component of image data. The entropy decoders 616A-16D may decode the bit planes of the digital signal, utilizing decoding methods or data decompression methods such as arithmetic coding, exponential-Golomb coding, RLE decoding, Huffman coding, or any combination thereof to achieve its decoding. The decoded data for each component of the image data may be received as inputs to the de-quantizers/accumulators 614A-14D.

In an embodiment, the de-quantizers/accumulators 614A-14D comprises hardware and/or software executed by the same or a different computing device as performed in the bridge receiver 620. The computing device performing the de-quantizers/accumulators 614A-14D processes may receive as input decoded wavelet blocks, which may originate from components of image data from the Bayer frame 602. In some examples, the input wavelet blocks may be frames consisting of wavelet blocks, originating from the original components of an image data processed by the accumulator/quantizers 514A-14D in FIG. 5.

The de-quantizers portion may de-quantize the wavelet blocks, restoring them to their original dynamic range and format. The accumulator portion may restore the input wavelet blocks to their original complete form. In some examples, this may look like a wavelet blocks, based on an identifier, which may include metadata or some other indication of certain characteristics of the wavelet blocks, being reconstructed into the original wavelet blocks it comprised of. These wavelet blocks may then be output to be further processed. Further information regarding the de-quantizers/accumulators 614A-14D may be found in the description of FIG. 8.

In an embodiment, the inverse wavelet transforms 612A-12C comprises hardware and/or software executed by the same or a different computing device as performed in the bridge receiver 620. The computing device performing the inverse wavelet transforms 612A-12C may receive as inputs wavelet blocks, which may correspond to component values of a color component of an image. In some examples, the input are de-quantized sets of wavelet blocks, output from the de-quantizers/accumulators 614B-14D. In an example, the inverse wavelet transforms 612A-12C, which may include sequences of functions (such as the Haar wavelet transform, or Cohen-Daubechies-Feauveau 9/7 wavelet transform, or LeGall 5/3 wavelet transform), generate the original component color values from the input wavelet blocks. The inverse wavelet transforms 612A-12C may achieve this by rejoining the high sub-band and low sub-bands of the wavelets in various permutations. For example, the inverse wavelet transform 612C may receive as an input wavelet blocks that were created by applying a process, such as the forward wavelet transform 512C in FIG. 5, to values of a component of color. The inverse wavelet transform 612C may revert the input wavelet blocks to the original values of the component of color, and output those values in the form of the color component red (R) 606C.

In an embodiment, the high and low sub-bands 610A-10B are high frequency bands, or intervals, and low frequency bands, or intervals, of the G component 606A. The low sub-band 610B may contain the most substantial parts of the G component 606A, while the high sub-band 610A may contain only small differential corrections of the G component 606A. Further information regarding the sub-bands can be found in the description of FIG. 3.

In an embodiment, the inverse quadrature mirror filter 608 is a filtering performed by the same or a different computing device as performed in the bridge receiver 620. The computing device performing the filtering may rejoin the high and low sub-bands 610A-10B into a singular green G 606A component. The inverse quadrature mirror filter 608 may include an inverse quadrature mirror filter, various average and difference filters, or any combination thereof to achieve the rejoining.

In an embodiment, the components green (G), red (R), and blue (B) 606A-06C are the color components of the Bayer frame 602 image. The components may be generated from the output of the component splitter 504 in FIG. 5. For example, the component splitter 504 may split an input image, which may include the Bayer frame 602 image, into its three color components, green (G), red (R), and blue (B) 606A-06C.

In an embodiment, the component mosaic 604 comprises hardware and/or software executed by the same or a different computing device as performed in the bridge receiver 620. The computing device performing the steps of the component mosaic 604 process receives as inputs values of components of color. In some examples, these component color input values may originate from an input image, such as the Bayer frame 502 of FIG. 5. The component mosaic 604 may rejoin the input values to output a singular image comprising of all of the input color components. The singular image may be the reconstructed Bayer frame 602. For example, Bayer frame 502 of FIG. 5 may have been split and processed by the processes in FIG. 5 and FIG. 6. The component mosaic 604 may take the processed components 606A-06C, which may have originated from Bayer frame 502, and recombine the components to create Bayer frame 602, which may be the exact same image as Bayer frame 502.

The Bayer frame may comprise raw image data that may be stored to persistent storage in this form and/or processed into another color scheme for display on a display device. In some examples, a "display device" (also referred to as a "monitor" or "screen") refers to a device capable of representing information (e.g., words, numbers, drawings, images, etc.) visually (e.g., by a cathode-ray tube, liquid crystal display, light emitting diode, projection surface, etc.) that provides visual output from an image or video output device (e.g., computer, cable box, video camera, etc.).

In an embodiment, the Bayer frame 602 is a mosaic of grids with cells that react to light. Each grid includes a two-by-two submosaic, containing 2 green filters, 1 blue filter, and 1 red filter; each filter corresponding to one pixel sensor. The Bayer frame 602 may be formatted according to a specific raw image format, such as Tag Image File Format/Electronic Photography (TIFF/EP), raw image format (RAW), or Digital Negative (DNG). The Bayer frame 602 may also be one of a sequence of frames captured during a video capture event of a scene. The Bayer frame 602 may also be the image data that is contained within the compressed stream 622. For example, compressed stream 622 may contain components of a raw image. The raw image may be reconstructed/decompressed via the processes depicted in FIG. 6, to create a resulting complete image Bayer frame 602. Further information regarding the Bayer frame 602 can be found in the description of FIG. 2.

Figure 7:
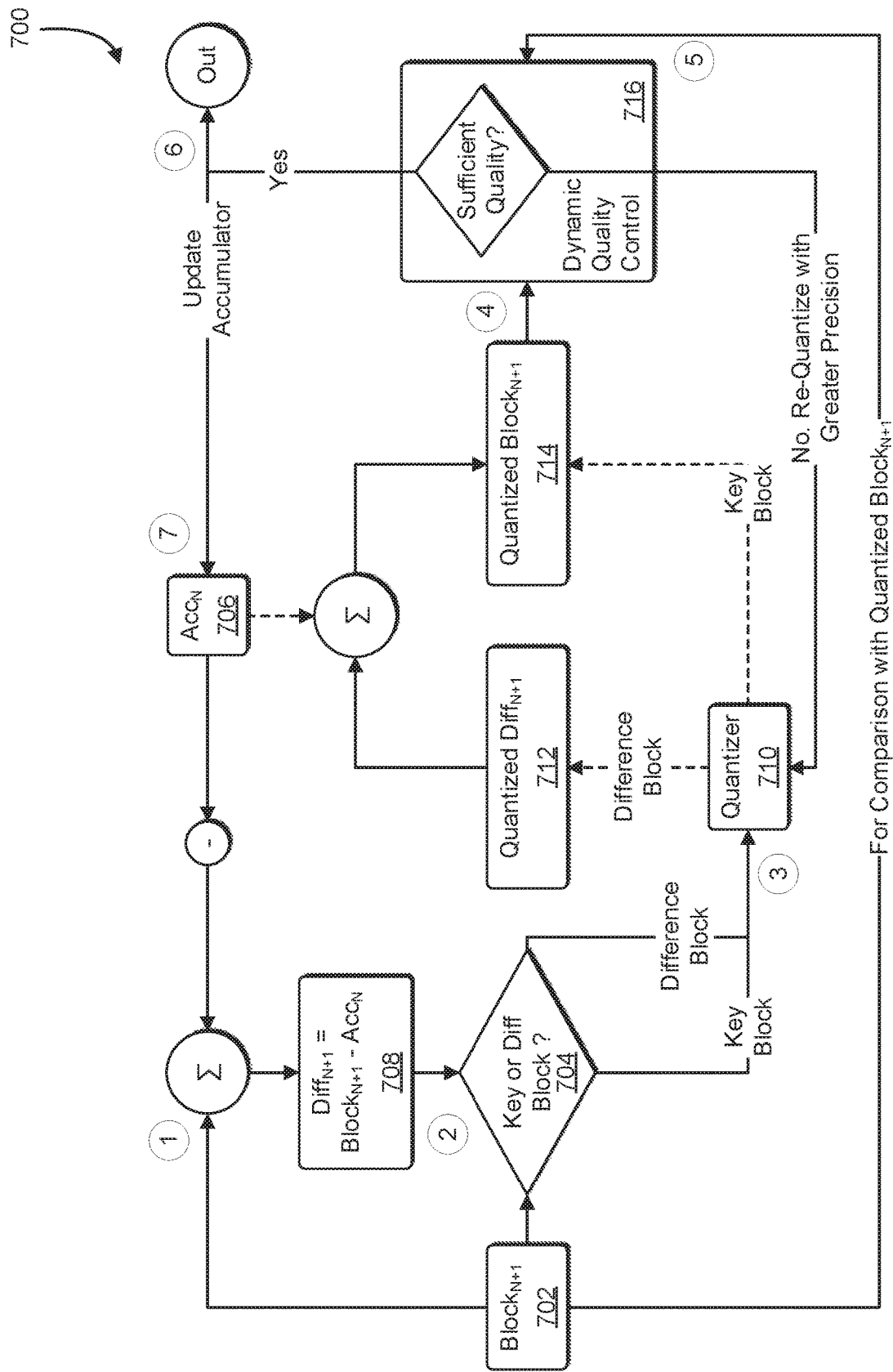
FIG. 7 illustrates an example of a continuous replenishment scheme in accordance with an embodiment.

FIG. 7 illustrates an example 700 of a continuous replenishment scheme of an embodiment of the present disclosure. The example 700 may be a set of processes that occur in the accumulator/quantizer (ACC/Q) 114 of FIG. 1. Specifically, FIG. 7 depicts the continuous replenishment scheme in which wavelet blocks from sequences of image frames, which may be a sequence of image frames captured during a video capture event of a scene, are actively compressed utilizing the output of previously compressed blocks.

In an embodiment, the input block 702 is one of a set of wavelet blocks that correspond to a component of an image frame, such as the Bayer frame 502 in FIG. 5, that has undergone certain processes, such as the forward wavelet transforms 512A-12C of FIG. 5. The input block 702 may be received as an input to the continuous replenishment process depicted in FIG. 7. At a time the input block 702 is received as input, the accumulator 706 may contain a previous block ($Acc_N$), where the previous block corresponds to the input block 702 (e.g., same position in the wavelet transform), but from a previous frame in the sequence of frames. Thus, any differences between the input block 702 and the previous block may be from changes that occurred in the captured scene between the times that the current image frame and the previous image frame were captured by an image capture device.

Thus, upon receiving the input block 702, the difference ($Diff_{N+1}$) between the input block 702 and the previous block may be calculated in difference module 708. The difference may be calculated any number of ways. For example, the difference may be a sum of differences between corresponding pixels of the input block 702 and the previous block. In some examples, each difference of the sum of differences may be an L1 norm. In other examples, each difference of the sum of differences may be an L2 norm. In still other implementations, the difference may be a difference between a sum of pixel values in the input block 702 and a sum of pixel values of the previous block. It is contemplated that other techniques may be used to calculate the difference. The difference may represent the changes between the image capture times of the input block 702 and the previous block. Such changes may be due to motion that occurred in the scene between the image capture times. For example, an object in motion (e.g., a running football player) may be in a first position in the previous block and in a second position in the input block 702; due to the change in positions, differences between pixels of the input block 702 that correspond to the pixels of the previous block (e.g., same position) that depict either where the object in motion is or was will be higher than pixels that depicts stationary objects in the scene. Alternatively, if the image capture device itself is in motion, differences between the corresponding pixels of the input block 702 and the previous block may be high. In contrast, if objects in the scene captured in the input block 702 and the previous block are relatively stationary (e.g., the scene is just grass on a sports field where no sports activity is occurring), differences between corresponding pixels of the input block 702 and the previous block are likely to be low.

Note that the previous block may have already been processed by the quantizer 710 and output, and therefore stored as a quantized block. Thus, the quantized previous block may then be compared to the input block 702, currently unquantized, in 704. Note that because the previous block may be quantized, the difference between the input block 702 and the previous block may include residual data that was discarded after quantization of the previous block. Based on the comparison, the input block 702 may be determined to be either a key block or a difference block. That is, if a large amount of motion occurred between the capture times of the input block 702 and the previous block [e.g., the difference calculated in difference module 708 exceeds a threshold (also referred to as a motion threshold)] and/or a large amount of residual data was discarded in the quantization of the previous block, the input block 702 may be determined in 704 as being a key block. Alternatively, if a small amount of motion occurred between the capture times of the input block 702 and the previous block [e.g., the difference calculated in difference module 708 exceeds a threshold (also referred to as a motion threshold)] and a negligible amount of residual data was discarded in the quantization of the previous block, the input block 702 may be determined in 704 to be a difference block.

In some examples, a key block comprises the entire block, whereas a difference block comprises only differences between pixels of the current block and the previous block. The difference block may contain less data than the entire block, and consequently it may be more efficient to process and send or store a difference block to be added to the previous block in the sequence than the key block. However, over time the residual data missing from successive quantizations may adversely affect image quality and it may improve image quality to occasionally provide a key block in order to reset the baseline block to which difference blocks will be added. It may also be important to occasionally provide a key block in order to compensate for potential dropped frames (e.g., due to interference or other technical issues with the communications channel). Additionally or alternatively, if there is a large amount of motion that occurred between the capture times of the input block 702 and the previous block, the difference block may not be much smaller (if at all) than the key block itself; in such a case with a large amount of motion (e.g., exceeds a motion threshold), it may be sufficiently efficient to simply send the key block rather than the difference block. By sending the key block, the residual image data removed from the previous block as a result of quantization, as well as the differences from the block to and the previous block attributable to motion, may be re-added by processing the input block 702 as a key block.

Once the determination in 704 of whether the input block 702 is a key block or a difference block, the key block or the differences (i.e., the difference block) may be provided to the quantizer 710 for quantization. As noted, in some examples, a key block may refer to the block itself, due to differences between the input block 702 and the previous block reaching a value relative to a threshold (e.g., exceeding a threshold), whereas a difference block may refer to a block that comprises differences between pixels of the input block 702 and the previous block. The (key or difference) block may then be quantized by the quantizer 710 according to a certain amount of precision.

In some examples, quantization refers to a form of lossy data compression whereby lower order bits making up the component value may be omitted, thereby keeping the higher order bits and reducing the amount of data to be stored or transmitted. It is contemplated, however, that in the present disclosure where quantization and inverse quantization is performed, alternative, lossless forms of data compression and decompression may be used instead. Note also that, in the context of the present disclosure, "quantization" may refer to forward quantization, whereas "de-quantization" may refer to inverse quantization. Because the set of possible output values of a quantizer is countable, a quantizer may be decomposed into two distinct stages. The first stage may be referred to as a forward quantization stage. During the first stage, the quantizer may map an input value to an integer quantization index. The second stage may be referred to as the inverse quantization stage, where the forward quantized data is reconstructed by mapping the index to a reconstruction value to achieve an approximation of the input value.

This decomposition is useful for the design and analysis of quantization behavior, and it illustrates how the quantized data can be communicated over a communication channel—a source encoder can perform the forward quantization stage and send the index information through a communication channel, and a decoder can perform the reconstruction stage to produce the output approximation of the original input data. In general, the forward quantization stage may use any function that maps the input data to the integer space of the quantization index data, and the inverse quantization stage can conceptually (or literally) be a table look-up operation to map each quantization index to a corresponding reconstruction value. This two-stage decomposition applies equally well to vector as well as scalar quantizers.

The quantizer 710 may quantize the key or difference block by, for example, keeping only the bits with the highest order of magnitude. For example, a pixel component may have a value of 255 in decimal, which may be expressed in binary as 11111111. The quantizer 710 may be configured to quantize with precision that keeps only the highest four bits and discards the lower four bits such that the quantized pixel component value becomes 11110000 (240 in decimal). In the event that it is determined (such as by the dynamic quality control module 716) that the key or difference block has been over-quantized (e.g., if a sum of differences between the input block 702 and the quantized key block 714 meet or exceed a quality threshold), the precision used by the quantizer 710 may be increased and the key or difference block may be re-quantized; for example, the quantizer 710 in the example above may determine to keep the highest five of eight bits and discard the lower three bits such that the quantized pixel component value becomes 11111000 (248 in decimal). This process of re-quantization may be iterated with increasing precision (e.g., keeping an increasing number of highest bits) until the quantized key block 714 is of sufficient quality (e.g., a sum of differences between the quantized key block and the input block 702 is below a quality threshold).

If the input block 702 was a key block, the quantized key block 714 may be provided to the dynamic quality control module 716. If the input block 702 was a difference block, the quantized difference block 712 may be added to the previous block in the accumulator 706 to produce the quantized key block 714, which may then be provided to the dynamic quality control module 716. The quantized key block 714 may be checked, by the dynamic quality control module 716, against a quality threshold to determine if the quality of the quantized block is acceptable. For example, a sum of differences between the input block 702 and the quantized key block 714 may be calculated. If the sum of differences reaches a value relative to a threshold (e.g., meets, exceeds, meets or exceeds, etc.) a threshold value (also referred to as a quality threshold), the dynamic quality control module may determine that the quantized block is over-quantized and signal the quantizer 710 to re-quantize the key or difference block to a greater amount of precision. In this manner, the quality of the image data output can be maintained in order to not adversely affect the viewer's experience. Additionally, the quality threshold may be adjusted as needed to trade quality for data size. In some implementations, the quality threshold may be dynamically adjusted based on bandwidth of the output communication channel. For example, if bandwidth is low, the quality threshold may be adjusted so that the quantizer 710 uses less precision to produce highly quantized (but smaller in data size) blocks, whereas if bandwidth is high, the quality threshold bay be adjusted so that the quantizer 710 uses greater precision to produce minimally quantized (but larger in data size) blocks.

Upon a determination that the quantized key block 714 is of acceptable quality, the quantized key block 714 may be output and stored in the accumulator 706. If not, the quantized block may be sent back to the quantizer 710 to be re-quantized as described above. Following the output of the quantized block, the quantized block may be copied to the accumulator 706. In an embodiment, the input block 702 is a wavelet block that represents a color component of an image. The wavelet blocks may have been output as the result of the forward wavelet transforms 512A-12C. The wavelet blocks may also originate from a component of color of an image, such as the green, red, and blue 506A-06C components of FIG. 5. The input block 702 may also be one of a plurality of wavelet blocks of a sequence of frames captured during a video capture event of a scene. Further information regarding the structure of the block as a result of the forward wavelet transforms can be found in the description of FIG. 4.

In an embodiment, the key or difference block decision 704 comprises hardware and/or software executed by a computing device, such as the computing device 1100 of FIG. 11, by multiples of such computing devices in a distributed system of a computing resource service provider, or by any virtual instantiation of such a computing device, to perform the process described below. The computing device performing the key or difference block decision 704 process may receive as inputs an input block 702, and a difference block resulting from the processes undergone in difference module 708. The key or difference block decision 704 may determine whether inputs constitute outputting a key block or a difference block, and output the resulting block accordingly. In some examples, a key block may refer to a block in which each pixel of the block is its full value, whereas a difference block may refer to a block in which each pixel of the block reflects only differences between the input block 702 and the previously output block. In an example, the input block 702 may be output as a key block if a sum of differences between the input block 702 and the previous block is drastically different (e.g., exceeds a threshold). Alternatively, the calculated differences output from difference module 708 may be output as a difference block if there are little differences between it and the input block 702.

In an embodiment, the accumulator 706 comprises memory of a computing device that has been allocated for the storage of quantized wavelet blocks that are output from the process depicted in FIG. 7. The computing device hosting the accumulator 706 may be the same or a different computing device as perform other parts of the process depicted in the example 700. The computing device hosting the accumulator 706 may receive as an input a processed block. The processed block may be the input block 702 after it has undergone the processes depicted in FIG. 7. The accumulator 706 may also store the processed block input. In some examples, the accumulator 706 may be updated; quantized difference blocks, such as the quantized difference block 712 may be added, or accumulated, to the accumulator 706, whilst quantized key blocks, such as the quantized key block 714, may replace the block in the accumulator 706.

In an embodiment, difference module 708 comprises hardware and/or software executed by the same or a different computing device as performed in 704. The computing device performing difference module 708 receives as inputs a transmitted block, and a newly input block 702. In some examples, the transmitted block may be the block previous to the input block 702, in which the input block 702 may be one of a plurality of wavelet block of a sequence of frames, after it has undergone the processes depicted in FIG. 7. The difference module 708 may calculate the differences between the blocks, utilizing the equation: $\text{Diff}_{N+1}$ (difference)=$\text{Block}_{N+1}$ (newly input block)−$\text{Acc}_N$ (transmitted block). The output of the differences calculated may be utilized as an input block to the key and difference block decision 704.

In an embodiment, quantizer 710 comprises hardware and/or software executed by the same or a different computing device as performed in 704. The computing device performing the quantizer 710 process may receive as an input the input block 702. The input block 702, which may be a component of a representation of an image, may be a wavelet block of a forward wavelet transform as illustrated in FIG. 4. The quantizer 710 may quantize the block based on an input user parameter; for example, the user may select the number of bits to be transmitted based on the quality restrictions. For example, the quantizer 710 may receive a block that utilizes eight bits to store its information. The quantizer 710 may reduce the bits in which the information is stored with to four, in effect reducing the precision of the information stored, but also substantially reducing the block's size. The data removed as a result of the quantization may be referred to as residual image data. The greater the precision, the less residual data may result from the quantization; likewise, the less precise the quantization, the more residual image data may be discarded.

In an embodiment, the quantized difference block 712 is a result of the quantizer 710 process on a block. In some examples, the quantized difference block 712 results from the difference block generated in difference module 708 undergoing the quantization process by means of the quantizer 710. The quantized difference block 712 may originate from the difference of the transmitted block and the newly input block 702; both of which may be a part of a sequence of frames captured during a video capture event of a scene.

In an embodiment, the quantized key block 714 is a result of the quantizer 710 process performed on a block. In some examples, the quantized key block 714 results from the input block 702 undergoing the quantization process by means of the quantizer 710. The input block 702 may originate from the forward wavelet transforms 512A-12C in FIG. 5, and may be one of a sequence of blocks captured during a video capture event of a scene.

In an embodiment, the dynamic quality control module 716 comprises hardware and/or software executed by the same or a different computing device as performed in 704. The computing device performing the dynamic quality control module 716 may receive as an input a quantized block. The quantized block may include the generated quantized key block 714, and may be the result of the quantization process, such as the quantizer 710, being applied to an input block 702. The dynamic quality control module 716 may decide, based on a user parameter, whether the quantized block meets the quality standards established. The criteria may include qualities such as pixel density, sharpness, bitrate, or any combination thereof. If it does so, the quantized block (e.g., the quantized difference block 712 or the quantized key block 714) may be transferred to be output. The output block may be stored in the accumulator to add to, in the case of the quantized difference block 712) or replace (in the case of the quantized key block) the previous block in the accumulator 706. In some embodiments, if the output block is a key block, the output block is stored in the accumulator 706 to replace the previous block in the accumulator 706. In some of these embodiments, if the output block is a difference block, the output block may be added to the previous block in the accumulator 706. If the quantized key block is of insufficient quality, the dynamic quality control module 716 may cause the quantizer 710 to re-quantize the key or difference block to a greater amount of precision. This process may repeat until the desired quality standards are met.

Figure 8:
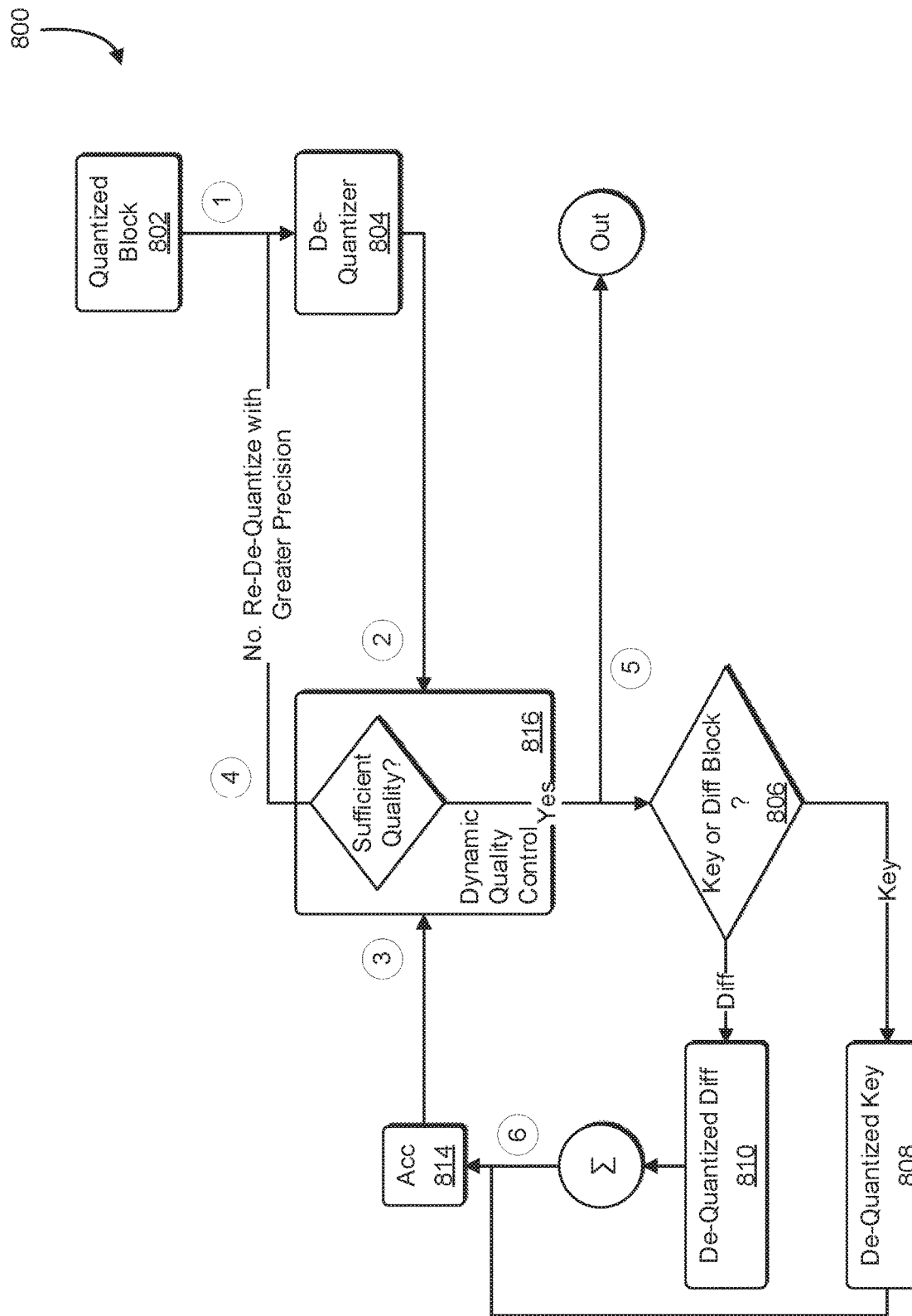
FIG. 8 illustrates an example of a decoding scheme in accordance with an embodiment.

FIG. 8 illustrates an example 800 of a decoding scheme of an embodiment of the present disclosure. The example 800 may be a set of processes that occur in the de-quantizer/accumulator ($Q^{-1}$/ACC) 134 of FIG. 1. Specifically, FIG. 8 depicts a decoding scheme in which a sequence of frames, which may be a sequence of frames captured during a video capture event of a scene, comprising a plurality of wavelet blocks may be actively decompressed and restored.

In an embodiment, the quantized block 802 received may be a quantized block such as the quantized block that is output from the processes described in FIG. 7. In an embodiment, the quantized block 802 is a quantized representation of one of the wavelet blocks of a wavelet transform of an image. The wavelet blocks may correspond to components of an image frame, such as an image frame output from the processes in FIG. 5. The quantized block 802 may have undergone quantization (such as described in conjunction with FIG. 7), in which the number of bit planes present in the block is reduced to decrease the space utilized by the block. The image frame to which the quantized block 802 is associated may also be one of a sequence of image frames captured during a video capture event of a scene. For example, the quantized block 802 may be a quantized wavelet block that corresponds to red color component values of an image, and may have undergone a forward wavelet transformation as well as quantization. Further details regarding the source of the quantized block 802 may be found in the descriptions of FIG. 9 and FIG. 7.

The quantized block 802 may be received as an input to the de-quantizer 804, for de-quantization (also referred to as inverse quantization). The de-quantizer 804 may be a process performed by a computing device, such as the computing device 1100 of FIG. 11, by multiples of such computing devices in a distributed system of a computing resource service provider, or by any virtual instantiation of such a computing device. The computing device performing the de-quantizer 804 process may receive as an input a quantized block 802. The quantized block 802, which may be a component of a representation comprised of wavelet blocks of an image. The de-quantizer 804 may de-quantize the block, restoring it to a more dynamic range and format, such as its original dynamic range and format. This may entail restoring the bits to which the original block consisted. For example, the quantized block 802 may have been quantized to occupy four bits rather than an original eight bits. The process of de-quantization may restore the quantized block 802 to occupy eight bits, thereby restoring the original range of the quantized block 802.

The process of de-quantization (also referred to as inverse quantization) may include adding lower value bits to the quantized blocks. In some implementations, the de-quantizer 804 may include a table comprising a set of reconstruction values. In an embodiment, there may be metadata included with the quantized block 802, which may include an index value that corresponds to a reconstruction value of the set that can be combined (e.g., additively) with the values in the quantized block in order to re-add bits to compensate for bits that were removed in the quantization process performed by the quantized 710 of FIG. 7.

The de-quantized block may then be processed as either a key block or a difference block in 806. The process may entail the usage of metadata (which may be included with the quantized block 802) to identify the de-quantized blocks. In some examples, a key block may refer to a block that includes full pixel values of the image data in the block (also referred to as a "full block"), whereas a difference block may refer to a block in which only differences between the pixels of the current block and the previously output block are present. A full block (pixel values comprising their full value) for output, storage in memory, or display may be generated adding the pixel values of a difference block to corresponding pixel values of the previously output block. Alternatively, the key block being itself a full block may be output, stored in memory to replace the previously output block, or directly displayed.

In an embodiment, the key or difference block decision 806 comprises hardware and/or software executed by the same or a different computing device as performed in the de-quantizer 804. The computing device performing the key or difference block decision 806 receives as an input a de-quantized block. The de-quantized block may be the result of the processes undergone in the de-quantizer 804. The key or difference block decision 806 may determine whether the input constitutes of a key block or a difference block, then output the block accordingly as a de-quantized key block 808 or a de-quantized difference block 810. In some examples, a key block may refer to a block in which the pixel values reflect their full value, whereas a difference block may refer to a block in which only differences between pixel values of successive corresponding blocks. In some examples, the determination to supply the block as a key block may be made if a large amount of motion occurred between capture of the current image frame and a previous image frame, or to synchronize the display to a new base image to which to add difference blocks. The determination of the key or difference block decision 806 may be based on an identifier, which may include metadata or some other indication tag present with the input de-quantized block.

In an embodiment, the de-quantized key block 808 is a result of the de-quantizer 804 process on a block, specifically a block that is determined to be a key block by the processes in 806. In some examples, the de-quantized key block 808 may be one of a sequence of blocks, and may refer to a block in which a drastic change (e.g., differences between successively captured frames exceeding a threshold, such as a motion threshold) between successively captured blocks occurs.

In an embodiment, the de-quantized difference block 810 is a result of the de-quantizer 804 process on a block, specifically a block that is determined to be a difference block by the processes in 806. In some examples, the de-quantized difference block 810 may be a wavelet block from one of a sequence of frames, and may refer to a block in which only small differences are present with respect to a corresponding block of a wavelet transform of a previous frame.

Some implementations of the present disclosure include a dynamic quality control module 816. In some embodiments, the de-quantized key block 808, or the de-quantized difference block 810 combined (e.g., additively) with a corresponding previous block in the accumulator 814, may be provided to the dynamic quality control module 816. The dynamic quality control module 816 may determine whether the de-quantized (key or difference) block is of sufficient quality to output. For example, the dynamic quality control module 816 may determine that a difference between the quantized block 802 and the de-quantized block is at a value relative to (e.g., falls to, falls below, etc.) a quality threshold (e.g., an insufficient number of bits have been restored to the quantized block) and may signal the de-quantizer 804 to de-quantize the quantized block 802 again using greater precision (e.g., restore the next most significant bit). In some embodiments, the quality threshold may be specified by a user, whereas in other cases the quality threshold may be dynamically adjusted. For example, if output bandwidth or available storage space is low, the quality threshold may be dynamically adjusted by a computer system executing a process of the present disclosure to a reduced quality value, whereas if output bandwidth or available storage space is high, the quality threshold may be dynamically adjusted by the computer system executing a process of the present disclosure to an increased quality value.

Upon a determination by the dynamic quality control module 816 that the de-quantized (key or difference) block is of sufficient quality (e.g., meets the specified quality criteria), the de-quantized (key or difference block) may be output and the accumulator 814 may be updated to reflect the most-recently output block. If the de-quantized block is processed as a de-quantized key block 808, then the accumulator 814 block may be replaced by the de-quantized key block 808 and be output. If the de-quantized block is processed as a de-quantized difference block 810, then it may be added to the accumulator 814 block and the accumulator 814 block may be sent out.

In an embodiment, the accumulator 814 comprises memory of a computing device that has been allocated for the storage of de-quantized wavelet blocks that are output from the process depicted in FIG. 8. The computing device hosting the accumulator 814 may be the same or a different computing device as perform other parts of the process depicted in the example 800. The computing device performing the accumulator 814 process may receive as an input a de-quantized key block from the key or difference block decision 812, which may include the de-quantized key block 808, or a de-quantized difference block, such as the de-quantized difference block 810. The accumulator 814 may either replace its accumulation with a de-quantized key block 808, or add the de-quantized difference block 810 to its accumulation. For example, the accumulator 814 may receive as an input a de-quantized key block 808; based on the input, the accumulator 814 may replace its accumulation with the de-quantized key block 808, and output the accumulation. In another example, the accumulator 814 may receive as an input a de-quantized difference block 810; based on the input, the accumulator 814 may accumulate, or add, the de-quantized difference block 810 to its accumulation, and output that accumulation.

Figure 9:
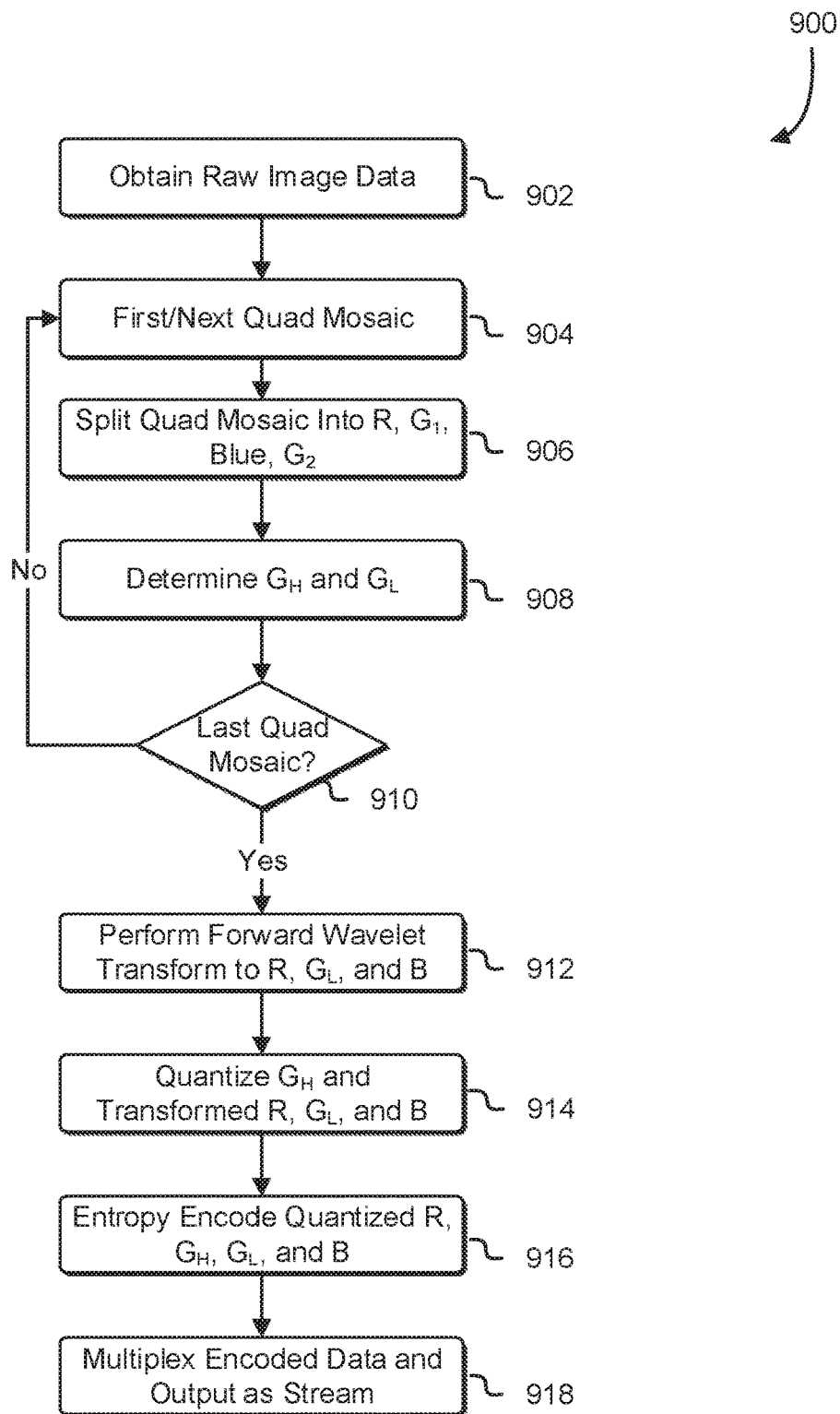
FIG. 9 is a flowchart that illustrates an example of compressing image data in accordance with an embodiment.

FIG. 9 is a flowchart illustrating an example of a process 900 for compressing image data in accordance with various embodiments. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 11:
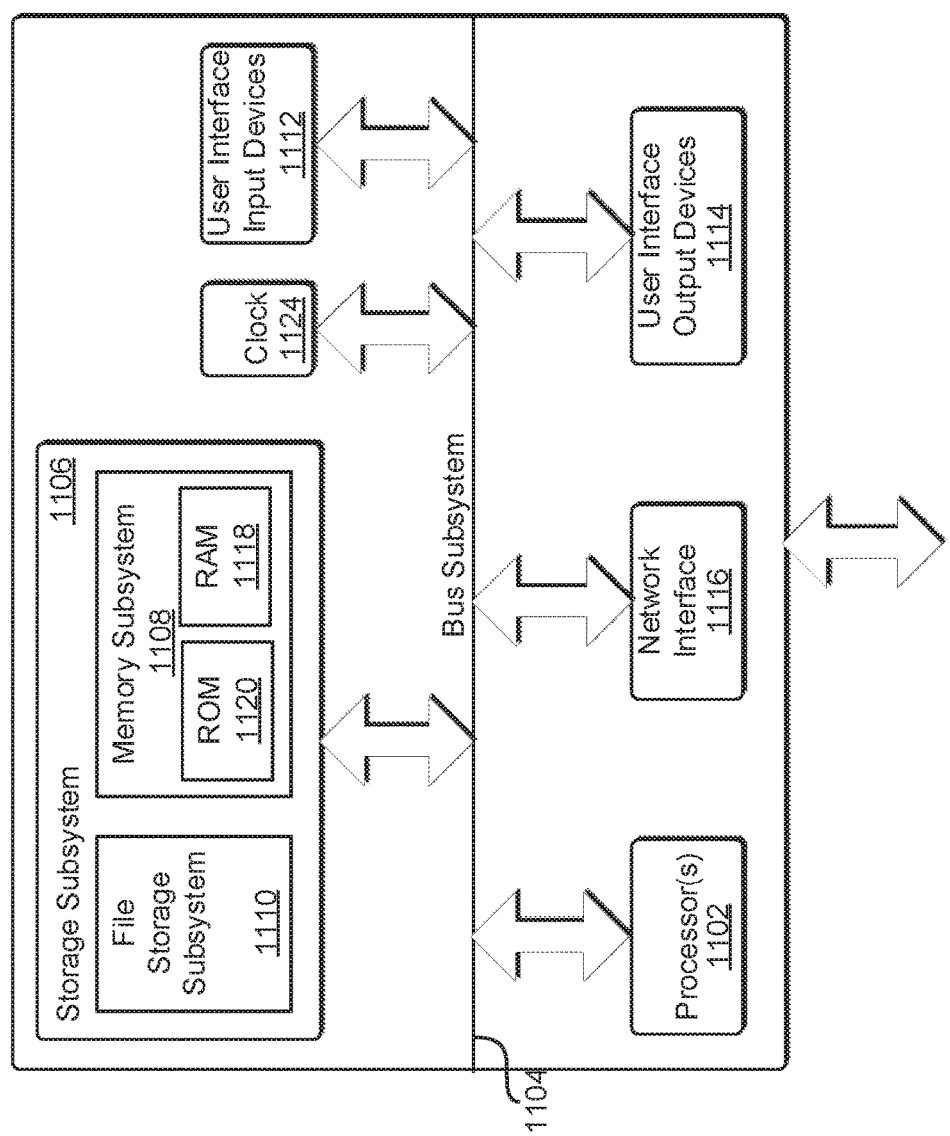
FIG. 11 illustrates an environment in which various embodiments can be implemented.

For example, some or all of process 900 may be performed by the computing device 1100 described in conjunction with FIG. 11. The process 900 includes a series of operations wherein an image (e.g., an image from a sequence of images comprising a video recording) may be compressed by first decomposing the image into its respective components, transforming the components, then encoding the data and outputting it as a stream using a multiplexer.

In 902, the system performing the process 900 obtains raw image data, which may include the image data 102, 502, or 602 of FIG. 1, FIG. 5, and FIG. 6, respectively. The raw image data may be one of a sequence of images that comprise a video capture of an event. In some examples, the raw image data may be a Bayer frame image, which may have the format depicted in FIG. 2.

In 904, the system performing the process 900 identifies the quad mosaics that the raw image data comprises of. The quad mosaics may correspond to the Bayer frame image format, which may be created by overlaying an image sensor with a color filter array (CFA) or a color filter mosaic (CFM). These filters may create an image that comprises of a grid of quad (two-by-two) mosaics.

In 906, the system performing the process 900 splits the quad mosaics identified in 904 into its respective components. The components may correspond to components of color, such as red, green, and blue. The components may also correspond to the Bayer frame image format, which comprises of a mosaic of grids; each grid includes a two-by-two submosaic, containing 2 green filters, 1 blue filter, and 1 red filter. In some examples, the quad mosaic is split directly into the components that the Bayer frame image format comprises of, namely red (R), blue (B), and two green ($G_1$ and $G_2$). Further information regarding the Bayer frame image format can be found in the description of FIG. 2.

In 908, the system performing the process 900 determines the high and low sub-bands ($G_H$ and $G_L$) of the green components ($G_1$ and $G_2$) of the raw image data. The system may generate these high and low sub-bands by the use of a filter. In some examples, a quadrature mirror filter may be utilized to create the high and low sub-bands by creating an average and difference between the values of the green components. The low sub-band may contain the most substantial part of the green components, while the high sub-band may contain only small differential corrections to the green components. The creation of the sub-bands may entail the use of a quadrature mirror filter, various average and difference filters, or any combination thereof. Further information regarding the creation of the high and low sub-bands can be found in the description of FIG. 3.

In 910, the system performing the process 900 determines if there are remaining quad mosaics to be processed from the raw image data obtained in 902. If so, the process 900 may continue to identify quad mosaics that the raw image data comprises of by proceeding to 904. If there are no remaining quad mosaics to be processed, the process 900 may then proceed to 912.

In 912, the system performing the process 900 performs a forward wavelet transform on the red (R) and blue (B) components of the raw image data, as well as the low sub-band ($G_L$) of the green component of the raw image data. The forward wavelet transform, which may include sequences of functions (such as the Haar wavelet transform, or Cohen-Daubechies-Feauveau 9/7 wavelet transform, or LeGall 5/3 wavelet transform), separates each of the components values into high sub-bands and low sub-bands, and regroups the values in various permutations. The forward wavelet transform may produce wavelet blocks as outputs from the components. Further information regarding the forward wavelet transform can be found in the description of FIG. 4.

In 914, the system performing the process 900 quantizes the high sub-band ($G_H$) of the green component, as well as the transformed components red (R), low sub-band green ($G_L$), and blue (B), from 912. The system may select a number of bit planes to transmit based on a user parameter. The number of bit planes selected may vary based on restrictions on the quality of the components. For example, the red (R) component may be represented with eight bits, and may undergo quantization so that compression is maximized. This may result in the values for the red (R) component being stored in four bits rather than eight bits, therefore reducing the total bits required to represent the component. Further information regarding the quantizer may be found in the description of quantizer 710 of FIG. 7.

In 916, the system performing the process 900 entropy encodes and compresses the quantized red (R), high sub-band of green ($G_H$), low sub-band of green ($G_L$), and blue (B) components. The system may losslessly encode each component, utilizing encodings or data compression methods such as arithmetic coding, Golomb coding, RLE encoding, Huffman coding, or any combination thereof to achieve its encoding.

In 918, the system performing the process 900 multiplexes the encoded data output from 916 into a singular stream, and outputs the multiplexed stream. The system receives the encoded quantized components from the raw image data: the components being red (R), high sub-band of green ($G_H$), low sub-band of green ($G_L$), and blue (B). The system multiplexes, or joins together as a singular stream, the components to be output; an individual stream may be formed comprising of the aforementioned components. The stream may be stored in a file, or demultiplexed elsewhere to be decompressed. Note that one or more of the operations performed in 902-18 may be performed in various orders and combinations, including in parallel.

Figure 10:
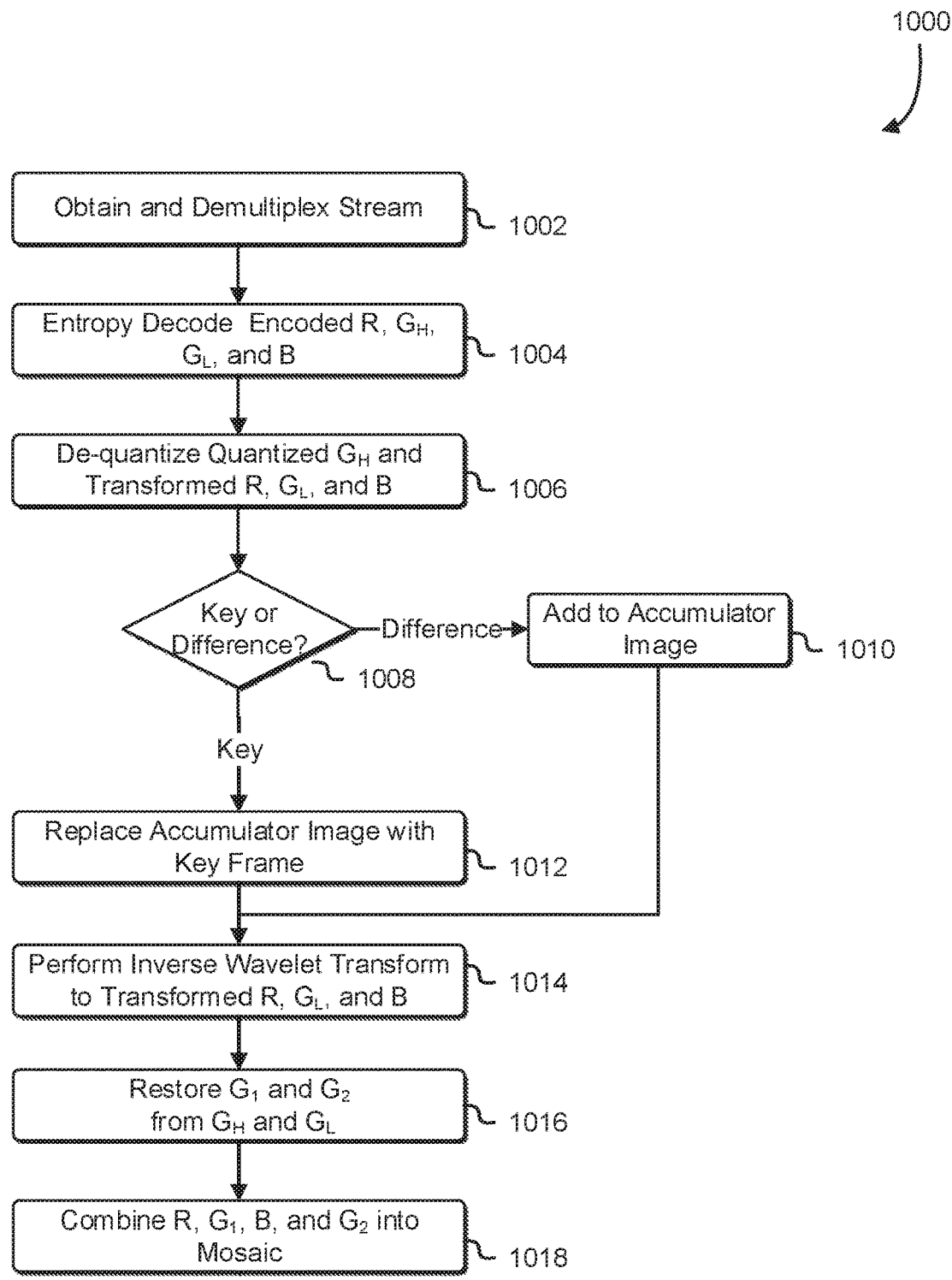
FIG. 10 is a flowchart that illustrates an example of decompressing image data in accordance with an embodiment.

FIG. 10 is a flowchart illustrating an example of a process 1000 for decompressing image data in accordance with various embodiments. Some or all of the process 1000 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1000 may be performed by the computing device 1100 described in conjunction with FIG. 11. The process 1000 includes a series of operations wherein an encoded and compressed stream (e.g., a compressed stream resulting from the processes depicted in process 900 of FIG. 9), which may comprise of compressed components of a raw image, may be decompressed by first demultiplexing the stream into its respective components, decoding the components, de-quantizing the components, re-accumulating the components, transforming the components and combining them utilizing a component mosaic into an original form.

In 1002, the system performing the process 1000 obtains an encoded and compressed stream, and demultiplexes it into its respective components that the stream comprises of. The stream may be a compressed stream such as the compressed stream generated in the process 900 of FIG. 9. The compressed stream may originate from the compression and encoding of raw image data. 1002 demultiplexes the compressed stream; in an example, the compressed stream may contain compressed color components of an image multiplexed together. The compressed color components may be separated as individual compressed color components as a result of the demultiplexing in 1002, and output.

In 1004, the system performing the process 1000 entropy decodes the encoded components. The encoded components may be a result of the demultiplexing in 1002, and may include the color components red (R), high sub-band green ($G_H$), low sub-band green ($G_L$), and blue (B). The system may decode the encoded components, utilizing decoding methods or data decompression methods such as arithmetic coding, Golomb coding, RLE decoding, Huffman coding, or any combination thereof to achieve its decoding. Further information regarding the entropy decoding may be found in the descriptions of 616A-16D of FIG. 6.

In 1006, the system performing the process 1000 de-quantizes the quantized components, such as the high sub-band ($G_H$) of the green component as well as the transformed components red (R), low sub-band green ($G_L$), and blue (B). The system may receive these inputs as wavelet blocks, and de-quantize the wavelet blocks, restoring them to their original dynamic range and format. For example, the red (R) component may have originally been represented with eight bits. Through quantization, the red (R) component may now be represented with four bits. The process of de-quantization may restore the red (R) component to its original form of representation with eight bits.

In 1008, the system performing the process 1000 determines if the received components, which may include de-quantized wavelet blocks output from 1006, constitutes a key block or a difference block. In some examples, a key block may refer to a block in which a drastic change (e.g., a sum of pixel differences exceed a threshold) between successive blocks in a sequence of frames occurs, and a difference block may refer to a block in which only small differences (e.g., the sum of pixel differences are at or below the threshold) are present. Based on the determination, the system may utilize the block either as an addition to the accumulator, in the case of a difference block, or a replacement of the accumulator image, in the case of a key block. The system may make the key or difference block determination based on an identifier, such as metadata or some other identifying tag.

In 1010, the system performing the process 1000 adds a received block to the accumulator image. The accumulator image may accumulate the newly arrived blocks. The system in 1010 receives a difference block; a difference block may refer to a block in which only small differences are present with respect to a sequence of blocks. The system may add the difference block to the block stored in the accumulator. In some examples, this may result in the original block being restored from its components.

In 1012, the system performing the process 1000 replaces the accumulator image with a received block. The system in 1014 receives a key block; a key block may refer to a block in that contains the full component value in respective pixels. The system may replace the accumulator block with the received key block. In some examples, this may result in the original block being restored.

In 1014, the system performing the process 1000 performs an inverse wavelet transform on the red (R) and blue (B) components, as well as the low sub-band ($G_L$) of the green component from the stream obtained in 1002. The components may be components originating from raw image data such as the raw image data obtained in 902 of FIG. 9, and may be of the form of wavelet blocks. The inverse wavelet transform, which may include sequences of functions (such as the Haar wavelet transform, or Cohen-Daubechies-Feauveau 9/7 wavelet transform, or LeGall 5/3 wavelet transform), converts the input wavelet blocks back into the spatial domain. Further information regarding the inverse wavelet transform may be found in the descriptions of 612A-12C of FIG. 6.

In 1016, the system performing the process 1000 restores the original green components ($G_1$ and $G_2$) from the high and low sub-bands ($G_H$ and $G_L$) of the green components. The system may generate the original green components by the use of a filter. In some examples, an inverse quadrature mirror filter may be utilized to restore the original green components from the high and low sub-bands of the green components. The creation of the original green components may entail the use of an inverse quadrature mirror filter, various average and difference filters, or any combination thereof.

In 1018, the system performing the process 1000 combines the components into a singular mosaic. The components may be the image components that a raw image data comprises of, such as red (R), green ($G_1$ and $G_2$), and blue (B). In some examples, the raw image data may also be the raw image data obtained in 902 of FIG. 9. The system combines the components to restore the original mosaic the components originated from. For example, the red (R), green ($G_1$ and $G_2$), and blue (B) components may be the color components of an image. The system may restore the original image by combining the components into a mosaic. The original image may be of the format of a Bayer frame; further information regarding a Bayer frame may be found in the description of FIG. 2. Note that one or more of the operations performed in 1002-18 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 11 is an illustrative, simplified block diagram of a computing device 1100 that can be used to practice at least one embodiment of the present disclosure. In various embodiments, the computing device 1100 may be used to implement any of the systems illustrated and described above. For example, the computing device 1100 may be configured for use as a data server, a web server, a portable computing device, a personal computer, or any electronic computing device. As shown in FIG. 11, the computing device 1100 may include one or more processors 1102 that, in embodiments, communicate with and are operatively coupled to a number of peripheral subsystems via a bus subsystem. In some embodiments, these peripheral subsystems include a storage subsystem 1106, comprising a memory subsystem 1108 and a file/disk storage subsystem 1110, one or more user interface input devices 1112, one or more user interface output devices 1114, and a network interface subsystem 1116. Such a storage subsystem 1106 may be used for temporary or long-term storage of information.

In some embodiments, the bus subsystem 1104 may provide a mechanism for enabling the various components and subsystems of device 1100 to communicate with each other as intended. Although the bus subsystem 1104 is shown schematically as a single bus, alternative embodiments of the bus subsystem utilize multiple buses. In an embodiment, the network interface subsystem 1116 may provide an interface to other computing devices and networks. In an embodiment, the network interface subsystem 1116 may serve as an interface for receiving data from and transmitting data to other systems from the computing device 1100. In some embodiments, the bus subsystem 1104 is utilized for communicating data such as details, search terms, and so on.

In some embodiments, the user interface input devices 1112 include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1100. In some embodiments, the one or more user interface output devices 1114 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1100. In an embodiment, the one or more user interface output devices 1114 can be used, for example, to present user interfaces to facilitate user interaction with applications performing processes described and variations therein, when such interaction may be appropriate.

In some embodiments, the storage subsystem 1106 provides a computer-readable storage medium for storing the basic programming and data constructs that provide the functionality of at least one embodiment of the present disclosure. In an embodiment, the applications (programs, code modules, instructions), when executed by one or more processors in some embodiments, provide the functionality of one or more embodiments of the present disclosure and, in embodiments, are stored in the storage subsystem 1106. In an embodiment, these application modules or instructions can be executed by the one or more processors 1102. In various embodiments, the storage subsystem 1106 additionally provides a repository for storing data used in accordance with the present disclosure. In some embodiments, the storage subsystem 1106 comprises a memory subsystem 1108 and a file/disk storage subsystem 1110.

In embodiments, the memory subsystem 1108 includes a number of memories, such as a main random access memory (RAM) 1118 for storage of instructions and data during program execution and/or a read only memory (ROM) 1120, in which fixed instructions can be stored. In some embodiments, the file/disk storage subsystem 1110 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1100 includes at least one local clock 1124. In an embodiment, the at least one local clock 1124, in some embodiments, is a counter that represents the number of ticks that have transpired from a particular starting date and, in some embodiments, is located integrally within the computing device 1100. In various embodiments, the at least one local clock 1124 is used to synchronize data transfers in the processors for the computing device 1100 and the subsystems included therein at specific clock pulses and can be used to coordinate synchronous operations between the computing device 1100 and other systems in a data center. In another embodiment, the local clock is a programmable interval timer.

In an embodiment, the computing device 1100 could be of any of a variety of types, including a portable computer device, tablet computer, a workstation, or any other device described below. Additionally, the computing device 1100 can include another device that, in some embodiments, can be connected to the computing device 1100 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1100 for processing. Due to the ever-changing nature of computers and networks, the description of the computing device 1100 depicted in FIG. 11 is intended only as a specific example for purposes of illustrating the preferred embodiment of the device. Many other configurations having more or fewer components than the system depicted in FIG. 11 are possible.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated, and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media, and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising, for each wavelet block of a set of wavelet blocks of a current wavelet transform:
    obtaining a compressed block of a previous wavelet transform that corresponds to the wavelet block;
    determining a set of differences between the wavelet block and the compressed block;
    quantizing, dependent at least on a determination of whether to output a key block or a difference block, either the set of differences or the wavelet block to a first amount of precision to produce a first processed wavelet block;
    determining that a first relative error associated with the first processed wavelet block exceeds a quality threshold;
    re-quantizing, dependent at least on the determination of whether to output the key block or the difference block, either the set of differences or the wavelet block to a second amount of precision to produce a second processed wavelet block;
    determining that a second relative error between the wavelet block and the second processed wavelet block is at or below the quality threshold; and
    outputting, based at least in part on the second processed wavelet block, a portion of image data as either the key block or the difference block to be displayed as an image on a display device.

2. The computer-implemented method of claim 1, wherein the first relative error is a difference between pixel values of a first processed image frame from pixel values of an original image frame.

3. The computer-implemented method of claim 1, wherein the determination of whether to output the key block or the difference block comprises a result of determining whether a sum of the set of differences reaches a value relative to a motion threshold.

4. The computer-implemented method of claim 3, further comprising updating, depending at least in part on whether the second processed wavelet block is the key block or the difference block, an accumulator to include the second processed wavelet block by:
    as a result of determining to output the difference block, combining the difference block with a previously processed wavelet block in the accumulator; and
    as a result of determining to output the key block, overwriting the previously processed wavelet block in the accumulator with the second processed wavelet block.

5. A system, comprising:
one or more processors; and
memory including executable instructions that, if executed by the one or more processors, cause the system to:
compress a portion of a first wavelet transform associated with a first frame in a sequence to produce a compressed portion of the first wavelet transform;
store the compressed portion in the memory;
obtain a portion of a second wavelet transform associated with a second frame in the sequence;
determine a set of differences between the portion of the second wavelet transform and the compressed portion of the first wavelet transform;
generate a second compressed portion by determining, based at least in part on the set of differences, to compress an entirety of the portion of the second wavelet transform or compress only the set of differences; and
provide, based at least in part on the second compressed portion, a subset of a set of image data to be displayed on a display device.

6. The system of claim 5, wherein each difference of the set of differences is an L2 norm.

7. The system of claim 5, wherein:
the set of image data is a frame of raw image data; and
the subset is a portion of the frame of raw image data that corresponds to a particular color.

8. The system of claim 5, wherein:
the executable instructions that cause the system to generate the second compressed portion include instructions that cause the system to:
obtain a lowest resolution portion of the second wavelet transform;
on a condition that a sum of differences between the lowest resolution portion and the set of differences is a first value relative to a threshold:
compress the portion of the second wavelet transform to produce the second compressed portion; and
indicate that the second compressed portion is a key block of the set of image data; and
on a condition that the sum of differences is a second value relative to the threshold:
compress the set of differences to produce the second compressed portion; and
indicate that the second compressed portion is a difference block of the set of image data; and
the executable instructions that cause the system to provide the subset of image data include instructions that cause the system to provide the subset of image data as either the key block as indicated or the difference block as indicated.

9. The system of claim 8, wherein the executable instructions further include instructions that cause the system to:
quantize the key block or the difference block according to a first amount of precision to produce a quantized block;
determine a difference between the quantized block and the key block or the difference block;
as a result of the difference being a value relative to a quality threshold, re-quantize the key block or the difference block according to a second amount of precision to produce a re-quantized block; and
output the re-quantized block as the subset of image data.

10. The system of claim 8, wherein the executable instructions further include instructions that cause the system to:
allocate a portion of the memory for storage of the subset of image data; and
further as a result of the sum of differences being at the second value relative to the threshold, store the subset of image data in the portion of the memory allocated.

11. The system of claim 10, wherein the executable instructions further include instructions that:
on the condition that the second compressed portion is indicated as the key block, further cause the system to replace the compressed portion of the first wavelet transform in the portion of the memory with the second compressed portion; and
on the condition that the second compressed portion is indicated as the difference block, further cause the system to add the second compressed portion to the compressed portion of the first wavelet transform in the portion of the memory.

12. A non-transitory computer-readable storage medium having stored thereon executable instructions that, if executed by one or more processors of a computer system, cause the computer system to at least:
compress a first block of a wavelet transform of first image data to produce a first compressed block;
obtain a second block of a wavelet transform of second image data;
determine a set of differences between the second block and the first compressed block;
compress at least the set of differences to produce a second compressed block, the compression based on determining, dependent at least on the set of differences, whether to compress an entirety of the second block or only the set of differences; and
output, based at least in part on the second compressed block, a portion of third image data to be displayed on a display device.

13. The non-transitory computer-readable storage medium of claim 12, wherein the second image data is a wavelet transform of a current image frame and the first image data is a wavelet transform of a previously processed image frame.

14. The non-transitory computer-readable storage medium of claim 12, wherein the portion of third image data is a wavelet transform.

15. The non-transitory computer-readable storage medium of claim 12, wherein the executable instructions that cause the computer system to compress the first block to produce the first compressed block include instructions that cause the computer system to compress the first block to a first amount of compression using a lossy compression scheme.

16. The non-transitory computer-readable storage medium of claim 12, wherein:
the executable instructions further include instructions that cause the computer system to obtain a third block of the second image data, the third block being of lower resolution than the second block; and
the executable instructions that cause the computer system to output the portion of third image data include instructions that cause the computer system to:
compute a sum of differences between the third block and the second compressed block;
as a result of the sum of differences being a first value relative to a threshold:
compress the second block to produce a third compressed block; and output the third compressed block as the portion; and as a result of the sum of differences being a second value relative to the threshold, output the second compressed block as the portion.

17. The non-transitory computer-readable storage medium of claim 16, wherein each difference of the set of differences is an L1 norm.

18. The non-transitory computer-readable storage medium of claim 16, wherein the executable instructions further include instructions that cause the computer system to, as a result of a determination that the second compressed block is a difference block, add the difference block to a previously compressed block in a region of memory of the computer system.

19. The non-transitory computer-readable storage medium of claim 16, wherein the executable instructions further include instructions that cause the computer system to, as a result of a determination that the third compressed block is a key block, overwrite a previously compressed block in a region of memory of the computer system with the third compressed block.

20. The non-transitory computer-readable storage medium of claim 16, wherein:

the executable instructions that cause the computer system to output the third compressed block as the portion include instructions that cause the computer system to output the third compressed block as a key block; and the executable instructions that cause the computer system to output the second compressed block as the portion include instructions that cause the computer system to output the second compressed block as a difference block.

* * * * *